US010659788B2

United States Patent
Xu et al.

(10) Patent No.: US 10,659,788 B2
(45) Date of Patent: May 19, 2020

(54) BLOCK-BASED OPTICAL FLOW ESTIMATION FOR MOTION COMPENSATED PREDICTION IN VIDEO CODING

(71) Applicant: GOOGLE LLC, Mountain View, CA (US)

(72) Inventors: Yaowu Xu, Saratoga, CA (US); Bohan Li, Santa Barbara, CA (US); Jingning Han, Santa Clara, CA (US)

(73) Assignee: GOOGLE LLC, Mountain View, CA (US)

( * ) Notice: Subject to any disclaimer, the term of this patent is extended or adjusted under 35 U.S.C. 154(b) by 60 days.

(21) Appl. No.: 15/817,369

(22) Filed: Nov. 20, 2017

(65) Prior Publication Data

US 2019/0158843 A1    May 23, 2019

(51) Int. Cl.
| | |
|---|---|
| H04N 19/00 | (2014.01) |
| H04N 19/139 | (2014.01) |
| H04N 19/105 | (2014.01) |
| H04N 19/577 | (2014.01) |
| H04N 19/573 | (2014.01) |
| H04N 19/172 | (2014.01) |
| H04N 19/537 | (2014.01) |

(52) U.S. Cl.
CPC ......... *H04N 19/139* (2014.11); *H04N 19/105* (2014.11); *H04N 19/172* (2014.11); *H04N 19/537* (2014.11); *H04N 19/573* (2014.11); *H04N 19/577* (2014.11)

(58) Field of Classification Search
CPC .................................................... H04N 19/00
See application file for complete search history.

(56) References Cited

U.S. PATENT DOCUMENTS

| | | |
|---|---|---|
| 6,097,854 A | 8/2000 | Szeliski et al. |
| RE39,279 E | 9/2006 | Yukitake et al. |
| 2004/0252759 A1 | 12/2004 | John Winder et al. |
| 2008/0204592 A1 | 8/2008 | Jia et al. |
| 2013/0121416 A1* | 5/2013 | He ...................... H04N 19/597 |
| | | 375/240.14 |

(Continued)

FOREIGN PATENT DOCUMENTS

WO    2017/133661 A1    8/2017

OTHER PUBLICATIONS

Bankoski, et al., "Technical Overview of VP8, An Open Source Video Codec for the Web", Jul. 11, 2011, 6 pp.

(Continued)

*Primary Examiner* — Maryam A Nasri
(74) *Attorney, Agent, or Firm* — Young Basile Hanlon & MacFarlane, P.C.

(57) ABSTRACT

An optical flow reference frame portion (e.g., a block or an entire frame) is generated that can be used for inter prediction of blocks of a current frame in a video sequence. A forward reference frame and a backward reference frame are used in an optical flow estimation that produces a respective motion field for pixels of a current frame. The motion fields are used to warp some or all pixels of the reference frames to the pixels of the current frame. The warped reference frame pixels are blended to form the optical flow reference frame portion. The inter prediction may be performed as part of encoding or decoding portions of the current frame.

16 Claims, 12 Drawing Sheets

(56) References Cited

U.S. PATENT DOCUMENTS

| | | | |
|---|---|---|---|
| 2014/0307982 A1* | 10/2014 | Kanaev | G06T 3/4053 382/299 |
| 2015/0078456 A1 | 3/2015 | Hannuksela | |
| 2015/0339806 A1 | 11/2015 | Wu et al. | |
| 2017/0094305 A1 | 3/2017 | Li et al. | |

OTHER PUBLICATIONS

Bankoski et al., "VP8 Data Format and Decoding Guide", Independent Submission RFC 6389, Nov. 2011, 305 pp.

Bankoski et al., "VP8 Data Format and Decoding Guide draft-bankoski-vp8-bitstream-02", Network Working Group, Internet-Draft, May 18, 2011, 288 pp.

Series H: Audiovisual and Multimedia Systems, Coding of moving video: Implementors Guide for H.264: Advanced video coding for generic audiovisual services, International Telecommunication Union, Jul. 30, 2010, 15 pp.

"Introduction to Video Coding Part 1: Transform Coding", Mozilla, Mar. 2012, 171 pp.

"Overview VP7 Data Format and Decoder", Version 1.5, On2 Technologies, Inc., Mar. 28, 2005, 65 pp.

Series H: Audiovisual and Multimedia Systems, Infrastructure of audiovisual services—Coding of moving video, Advanced video coding for generic audiovisual services, International Telecommunication Union, Version 11, Mar. 2009. 670 pp.

Series H: Audiovisual and Multimedia Systems, Infrastructure of audiovisual services—Coding of moving video, Advanced video coding for generic audiovisual services, International Telecommunication Union, Version 12, Mar. 2010, 676 pp.

Series H: Audiovisual and Multimedia Systems, Infrastructure of audiovisual services—Coding of moving video, Amendment 2: New profiles for professional applications, International Telecommunication Union, Apr. 2007, 75 pp.

Series H: Audiovisual and Multimedia Systems, Infrastructure of audiovisual services—Coding of moving video, Advanced video coding for generic audiovisual services, Version 8, International Telecommunication Union, Nov. 1, 2007, 564 pp.

Series H: Audiovisual and Multimedia Systems, Infrastructure of audiovisual services—Coding of moving video, Advanced video coding for generic audiovisual services, Amendment 1: Support of additional colour spaces and removal of the High 4:4:4 Profile, International Telecommunication Union, Jun. 2006, 16 pp.

Series H: Audiovisual and Multimedia Systems, Infrastructure of audiovisual services—Coding of moving video, Advanced video coding for generic audiovisual services, Version 1, International Telecommunication Union, May 2003, 282 pp.

Series H: Audiovisual and Multimedia Systems, Infrastructure of audiovisual services—Coding of moving video, Advanced video coding for generic audiovisual services, Version 3, International Telecommunication Union, Mar. 2005, 343 pp.

"VP6 Bitstream and Decoder Specification", Version 1.02, On2 Technologies, Inc., Aug. 17, 2006, 88 pp.

"VP6 Bitstream and Decoder Specification", Version 1.03, On2 Technologies, Inc., Oct. 29, 2007, 95 pp.

"VP8 Data Format and Decoding Guide, WebM Project", Google On2, Dec. 1, 2010, 103 pp.

Sun, Deqing et al.; "Learning Optical Flow"; ECCV 2008, Part III, LNC 5304; pp. 83-97.

International Search Report and Written Opinion in PCT/US2018/032054, dated Jul. 23, 2018, 14 pgs.

Yi Chin et al., "Dense true motion field compensation for video coding", 2013 IEEE International Conference on Image Processing, IEEE, (Sep. 15, 2013), pp. 1958-1961.

J. Chen et al., "Algorithm description of Joint Exploration Test Model 7 (JEM7)", Joint Video Exploration Team (JVET) of ITU-T SG 16 WP 3 and ISO/IEC JTC1/SC29NVG11, 7th Meeting, Torino, Italy, Jul. 13-21, 2017 (url: http://phenix.int-evry.fr/jvet/, document no. JVET-G1001 (Aug. 19, 2017), 48 pgs.

Alexander Alshin et al., "Bi-directional Optical Flow for Future Video Codec", 2016 Data Compression —Conference (DCC), IEEE, Mar. 30, 2016, pp. 83-90.

A. Alshin et al., "Bi-directional optical flow for improving motion compensation", 2010 Picture Coding Symposium (PCS 2010), Nagoya, Japan, Dec. 8-10, 2010 (IEEE, Piscataway, NJ), pp. 422-425.

* cited by examiner

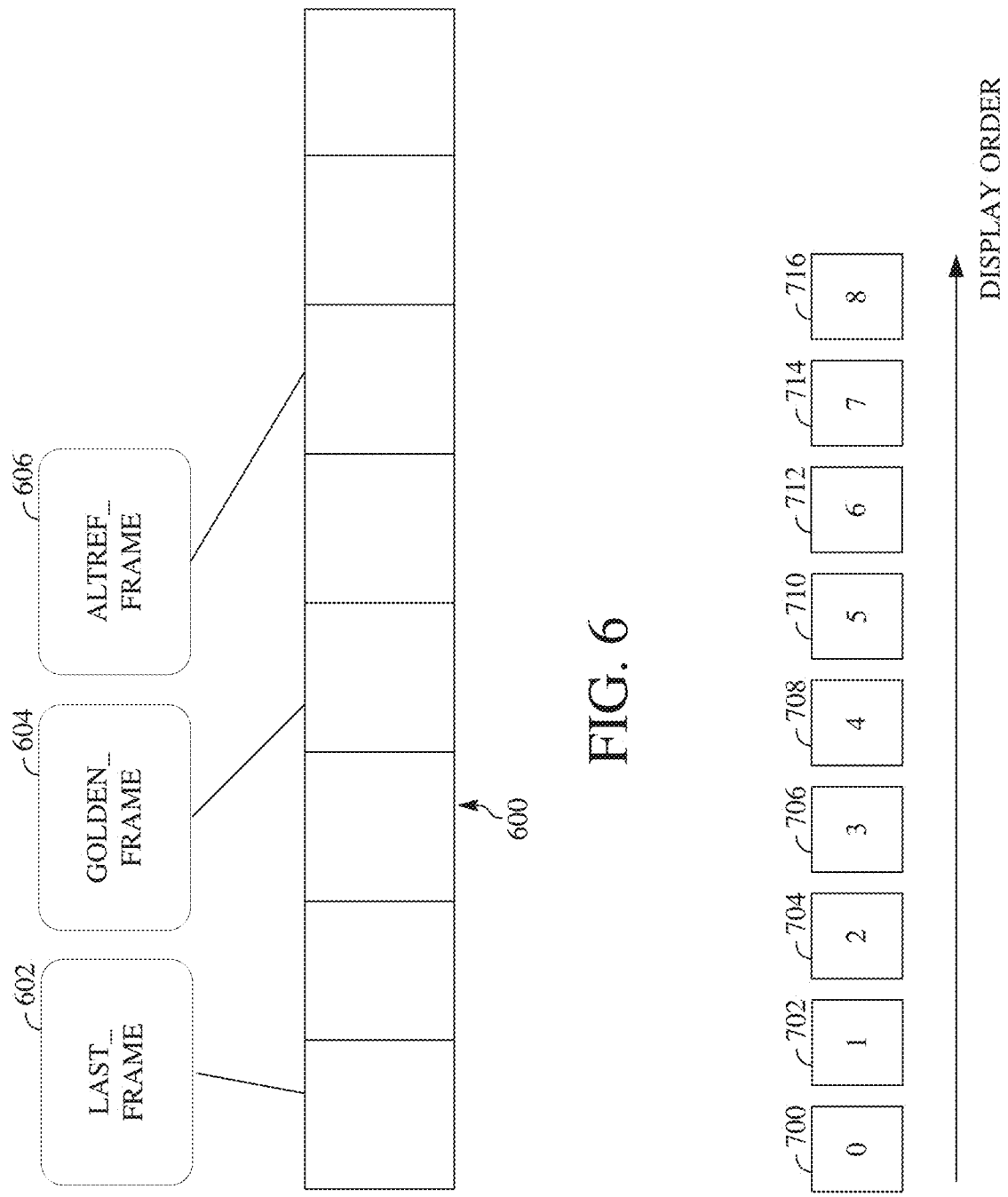

BLOCK-BASED OPTICAL FLOW ESTIMATION FOR MOTION COMPENSATED PREDICTION IN VIDEO CODING

BACKGROUND

Digital video streams may represent video using a sequence of frames or still images. Digital video can be used for various applications including, for example, video conferencing, high definition video entertainment, video advertisements, or sharing of user-generated videos. A digital video stream can contain a large amount of data and consume a significant amount of computing or communication resources of a computing device for processing, transmission or storage of the video data. Various approaches have been proposed to reduce the amount of data in video streams, including compression and other encoding techniques.

One technique for compression uses a reference frame to generate a prediction block corresponding to a current block to be encoded. Differences between the prediction block and the current block can be encoded, instead of the values of the current block themselves, to reduce the amount of data encoded.

SUMMARY

This disclosure relates generally to encoding and decoding video data and more particularly relates to using block-based optical flow estimation for motion compensated prediction in video compression. Frame-level based optical flow estimation is also described.

This disclosure describes encoding and decoding methods and apparatuses. A method according to an implementation of the disclosure determining a first frame portion of a first frame to be predicted, the first frame being in a video sequence, determining a first reference frame from the video sequence for forward inter prediction of the first frame, determining a second reference frame from the video sequence for backward inter prediction of the first frame, generating an optical flow reference frame portion for inter prediction of the first frame portion by performing an optical flow estimation using the first reference frame and the second reference frame, and performing a prediction process for the first frame portion using the optical flow reference frame. The first frame portion and optical flow reference frame portion can be a block, or an entire frame, for example.

An apparatus according to an implementation of the disclosure includes a non-transitory storage medium or memory and a processor. The medium includes instructions executable by the processor to carry out a method including determining a first frame to be predicted in a video sequence, and determining an availability of a first reference frame for forward inter prediction of the first frame and a second reference frame for backward inter prediction of the first frame. The method also includes, responsive to determining the availability of both the first reference frame and the second reference frame, generating a respective motion field for pixels of a first frame portion using the first reference frame and the second reference frame as input into an optical flow estimation process, warping a first reference frame portion to the first frame portion using the motion fields to form a first warped reference frame portion, the first reference frame portion comprising pixels of the first reference frame co-located with the pixels of the first frame portion, warping a second reference frame portion to the first frame portion using the motion fields to form a second warped reference frame portion, the second reference frame portion comprising pixels of the second reference frame co-located with the pixels of the first frame portion, and blending the first warped reference frame portion and the second warped reference frame portion to form an optical flow reference frame portion for inter prediction of at least one block of the first frame.

Another apparatus according to an implementation of the disclosure also includes a non-transitory storage medium or memory and a processor. The medium includes instructions executable by the processor to carry out a method including generating an optical flow reference frame portion for inter prediction of a block of a first frame of a video sequence using a first reference frame from the video sequence and a second reference frame of the video sequence by initializing motion fields for pixels of a first frame portion in a first processing level for an optical flow estimation, the first processing level representing downscaled motion within the first frame portion and comprising one level of multiple levels, and, for each level of the multiple levels warping the first reference frame portion to the first frame portion using the motion fields to form a first warped reference frame portion, warping the second reference frame portion to the first frame portion using the motion fields to form a second warped reference frame portion, estimating motion fields between the first warped reference frame portion and the second warped reference frame portion using the optical flow estimation, and updating the motion fields for pixels of the first frame portion using the motion fields between the first warped reference frame portion and the second warped reference frame portion. The method also includes, for a final level of the multiple levels, warping the first reference frame portion to the first frame portion using the updated motion fields to form a final first warped reference frame portion, warping the second reference frame portion to the first frame portion using the updated motion fields to form a final second warped reference frame portion, and blending the final first warped reference frame portion and the second warped reference frame portion to form the optical flow reference frame portion.

These and other aspects of the present disclosure are disclosed in the following detailed description of the embodiments, the appended claims and the accompanying figures.

BRIEF DESCRIPTION OF THE DRAWINGS

The description herein makes reference to the accompanying drawings described below wherein like reference numerals refer to like parts throughout the several views unless otherwise noted.

FIG. 6 is a block diagram of an example of a reference frame buffer.

FIG. 7 is a diagram of a group of frames in a display order of a video sequence.

DETAILED DESCRIPTION

Figure 1:
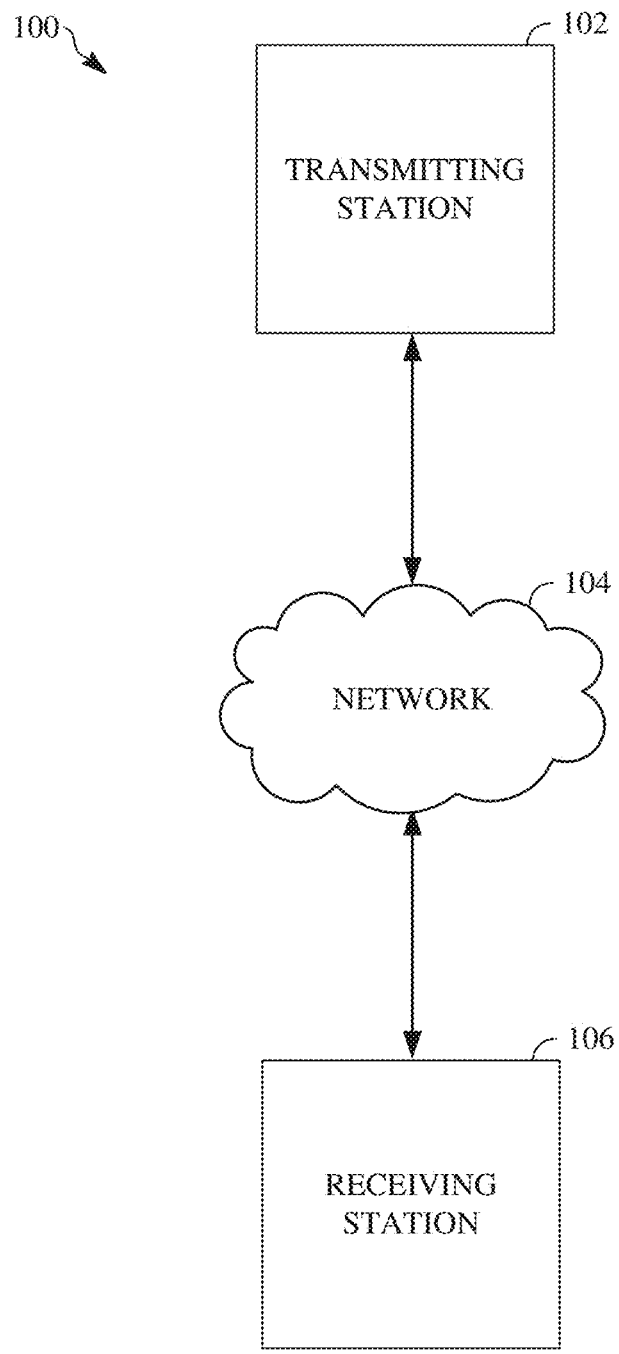
FIG. 1 is a schematic of a video encoding and decoding system.

A video stream can be compressed by a variety of techniques to reduce bandwidth required transmit or store the video stream. A video stream can be encoded into a bitstream, which involves compression, which is then transmitted to a decoder that can decode or decompress the video stream to prepare it for viewing or further processing. Compression of the video stream often exploits spatial and temporal correlation of video signals through spatial and/or motion compensated prediction. Inter-prediction, for example, uses one or more motion vectors to generate a block (also called a prediction block) that resembles a current block to be encoded using previously encoded and decoded pixels. By encoding the motion vector(s), and the difference between the two blocks, a decoder receiving the encoded signal can re-create the current block. Inter-prediction may also be referred to as motion compensated prediction.

Each motion vector used to generate a prediction block in the inter-prediction process refers to a frame other than a current frame, i.e., a reference frame. Reference frames can be located before or after the current frame in the sequence of the video stream, and may be frames that are reconstructed before being used as a reference frame. In some cases, there may be three reference frames used to encode or decode blocks of the current frame of the video sequence. One is a frame that may be referred to as a golden frame. Another is a most recently encoded or decoded frame. The last is an alternative reference frame that is encoded or decoded before one or more frames in a sequence, but which is displayed after those frames in an output display order. In this way, the alternative reference frame is a reference frame usable for backwards prediction. One or more forward and/or backward reference frames can be used to encode or decode a bock. The efficacy of a reference frame when used to encode or decode a block within a current frame can be measured based on a resulting signal-to-noise ratio or other measures of rate-distortion.

In this technique, the pixels that form prediction blocks are obtained directly from one or more of the available reference frames. The reference pixel blocks or their linear combinations are used for prediction of the given coding block in the current frame. This direct, block-based prediction does not capture the true motion activity available from the reference frames. For this reason, motion compensated prediction accuracy can suffer.

To more fully utilize motion information from available bi-directional reference frames (e.g., one or more forward and one or more backward reference frames), implementations of the teachings herein describe reference frame portions collocated with the current coding frame portions that use a per-pixel motion field calculated by optical flow to estimate the true motion activities in the video signal. Reference frame portions are interpolated that allow tracking of complicated non-translational motion activity, which is beyond the capability of conventional block-based motion compensated prediction determined directly from reference frames. Use of such reference frame portions can improve prediction quality. As used herein, a frame portion refers to some of all of a frame, such as a block, a slice, or an entire frame. A frame portion in one frame is collocated with a frame portion in another frame if they have the same dimensions and are at the same pixel locations within the dimensions of each frame.

Further details of using optical flow estimation to interpolate reference frame portions for use in video compression and reconstruction is described herein with initial reference to a system in which the teachings herein can be implemented.

FIG. 1 is a schematic of a video encoding and decoding system 100. A transmitting station 102 can be, for example, a computer having an internal configuration of hardware such as that described in FIG. 2. However, other suitable implementations of the transmitting station 102 are possible. For example, the processing of the transmitting station 102 can be distributed among multiple devices.

A network 104 can connect the transmitting station 102 and a receiving station 106 for encoding and decoding of the video stream. Specifically, the video stream can be encoded in the transmitting station 102 and the encoded video stream can be decoded in the receiving station 106. The network 104 can be, for example, the Internet. The network 104 can also be a local area network (LAN), wide area network (WAN), virtual private network (VPN), cellular telephone network or any other means of transferring the video stream from the transmitting station 102 to, in this example, the receiving station 106.

Figure 2:
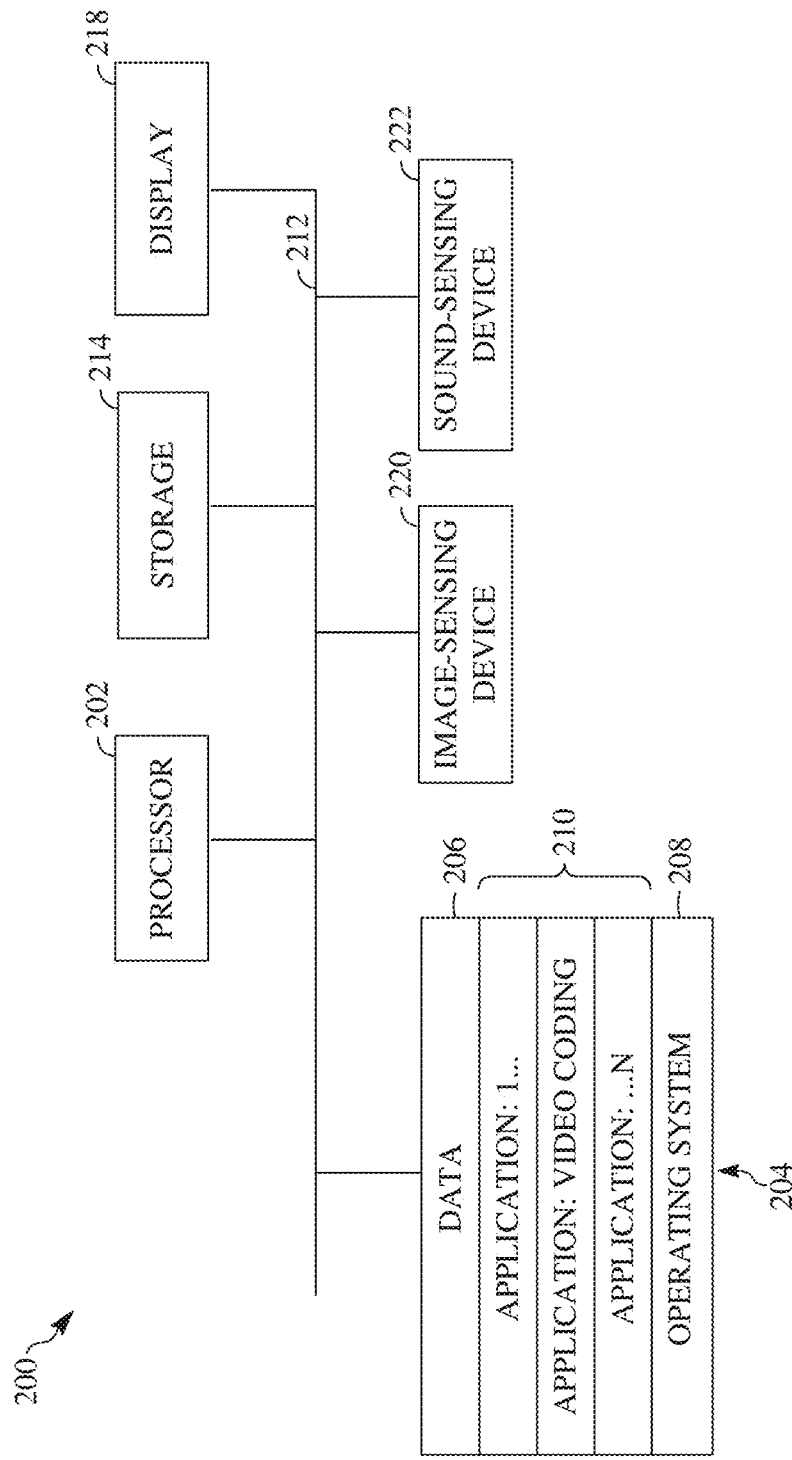
FIG. 2 is a block diagram of an example of a computing device that can implement a transmitting station or a receiving station.

The receiving station 106, in one example, can be a computer having an internal configuration of hardware such as that described in FIG. 2. However, other suitable implementations of the receiving station 106 are possible. For example, the processing of the receiving station 106 can be distributed among multiple devices.

Other implementations of the video encoding and decoding system 100 are possible. For example, an implementation can omit the network 104. In another implementation, a video stream can be encoded and then stored for transmission at a later time to the receiving station 106 or any other device having a non-transitory storage medium or memory. In one implementation, the receiving station 106 receives (e.g., via the network 104, a computer bus, and/or some communication pathway) the encoded video stream and stores the video stream for later decoding. In an example implementation, a real-time transport protocol (RTP) is used for transmission of the encoded video over the network 104. In another implementation, a transport protocol other than RTP may be used, e.g., a Hypertext Transfer Protocol (HTTP) based video streaming protocol.

When used in a video conferencing system, for example, the transmitting station 102 and/or the receiving station 106 may include the ability to both encode and decode a video stream as described below. For example, the receiving station 106 could be a video conference participant who receives an encoded video bitstream from a video conference server (e.g., the transmitting station 102) to decode and view and further encodes and transmits its own video bitstream to the video conference server for decoding and viewing by other participants.

FIG. 2 is a block diagram of an example of a computing device 200 that can implement a transmitting station or a receiving station. For example, the computing device 200 can implement one or both of the transmitting station 102 and the receiving station 106 of FIG. 1. The computing device 200 can be in the form of a computing system including multiple computing devices, or in the form of one computing device, for example, a mobile phone, a tablet computer, a laptop computer, a notebook computer, a desktop computer, and the like.

A CPU 202 in the computing device 200 can be a central processing unit. Alternatively, the CPU 202 can be any other type of device, or multiple devices, capable of manipulating or processing information now-existing or hereafter developed. Although the disclosed implementations can be practiced with one processor as shown, e.g., the CPU 202, advantages in speed and efficiency can be achieved using more than one processor.

A memory 204 in computing device 200 can be a read only memory (ROM) device or a random access memory (RAM) device in an implementation. Any other suitable type of storage device or non-transitory storage medium can be used as the memory 204. The memory 204 can include code and data 206 that is accessed by the CPU 202 using a bus 212. The memory 204 can further include an operating system 208 and application programs 210, the application programs 210 including at least one program that permits the CPU 202 to perform the methods described here. For example, the application programs 210 can include applications 1 through N, which further include a video coding application that performs the methods described here. Computing device 200 can also include a secondary storage 214, which can, for example, be a memory card used with a mobile computing device. Because the video communication sessions may contain a significant amount of information, they can be stored in whole or in part in the secondary storage 214 and loaded into the memory 204 as needed for processing.

The computing device 200 can also include one or more output devices, such as a display 218. The display 218 may be, in one example, a touch sensitive display that combines a display with a touch sensitive element that is operable to sense touch inputs. The display 218 can be coupled to the CPU 202 via the bus 212. Other output devices that permit a user to program or otherwise use the computing device 200 can be provided in addition to or as an alternative to the display 218. When the output device is or includes a display, the display can be implemented in various ways, including by a liquid crystal display (LCD), a cathode-ray tube (CRT) display or light emitting diode (LED) display, such as an organic LED (OLED) display.

The computing device 200 can also include or be in communication with an image-sensing device 220, for example a camera, or any other image-sensing device 220 now existing or hereafter developed that can sense an image such as the image of a user operating the computing device 200. The image-sensing device 220 can be positioned such that it is directed toward the user operating the computing device 200. In an example, the position and optical axis of the image-sensing device 220 can be configured such that the field of vision includes an area that is directly adjacent to the display 218 and from which the display 218 is visible.

The computing device 200 can also include or be in communication with a sound-sensing device 222, for example a microphone, or any other sound-sensing device now existing or hereafter developed that can sense sounds near the computing device 200. The sound-sensing device 222 can be positioned such that it is directed toward the user operating the computing device 200 and can be configured to receive sounds, for example, speech or other utterances, made by the user while the user operates the computing device 200.

Although FIG. 2 depicts the CPU 202 and the memory 204 of the computing device 200 as being integrated into one unit, other configurations can be utilized. The operations of the CPU 202 can be distributed across multiple machines (wherein individual machines can have one or more of processors) that can be coupled directly or across a local area or other network. The memory 204 can be distributed across multiple machines such as a network-based memory or memory in multiple machines performing the operations of the computing device 200. Although depicted here as one bus, the bus 212 of the computing device 200 can be composed of multiple buses. Further, the secondary storage 214 can be directly coupled to the other components of the computing device 200 or can be accessed via a network and can comprise an integrated unit such as a memory card or multiple units such as multiple memory cards. The computing device 200 can thus be implemented in a wide variety of configurations.

Figure 3:
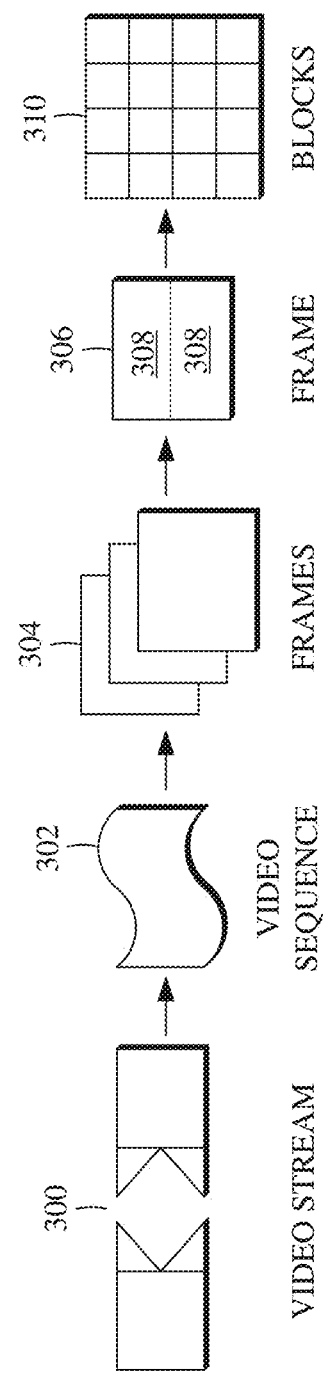
FIG. 3 is a diagram of a typical video stream to be encoded and subsequently decoded.

FIG. 3 is a diagram of an example of a video stream 300 to be encoded and subsequently decoded. The video stream 300 includes a video sequence 302. At the next level, the video sequence 302 includes a number of adjacent frames 304. While three frames are depicted as the adjacent frames 304, the video sequence 302 can include any number of adjacent frames 304. The adjacent frames 304 can then be further subdivided into individual frames, e.g., a frame 306. At the next level, the frame 306 can be divided into a series of planes or segments 308. The segments 308 can be subsets of frames that permit parallel processing, for example. The segments 308 can also be subsets of frames that can separate the video data into separate colors. For example, a frame 306 of color video data can include a luminance plane and two chrominance planes. The segments 308 may be sampled at different resolutions.

Whether or not the frame 306 is divided into segments 308, the frame 306 may be further subdivided into blocks 310, which can contain data corresponding to, for example, 16×16 pixels in the frame 306. The blocks 310 can also be arranged to include data from one or more segments 308 of pixel data. The blocks 310 can also be of any other suitable size such as 4×4 pixels, 8×8 pixels, 16×8 pixels, 8×16 pixels, 16×16 pixels, or larger. Unless otherwise noted, the terms block and macroblock are used interchangeably herein.

Figure 4:
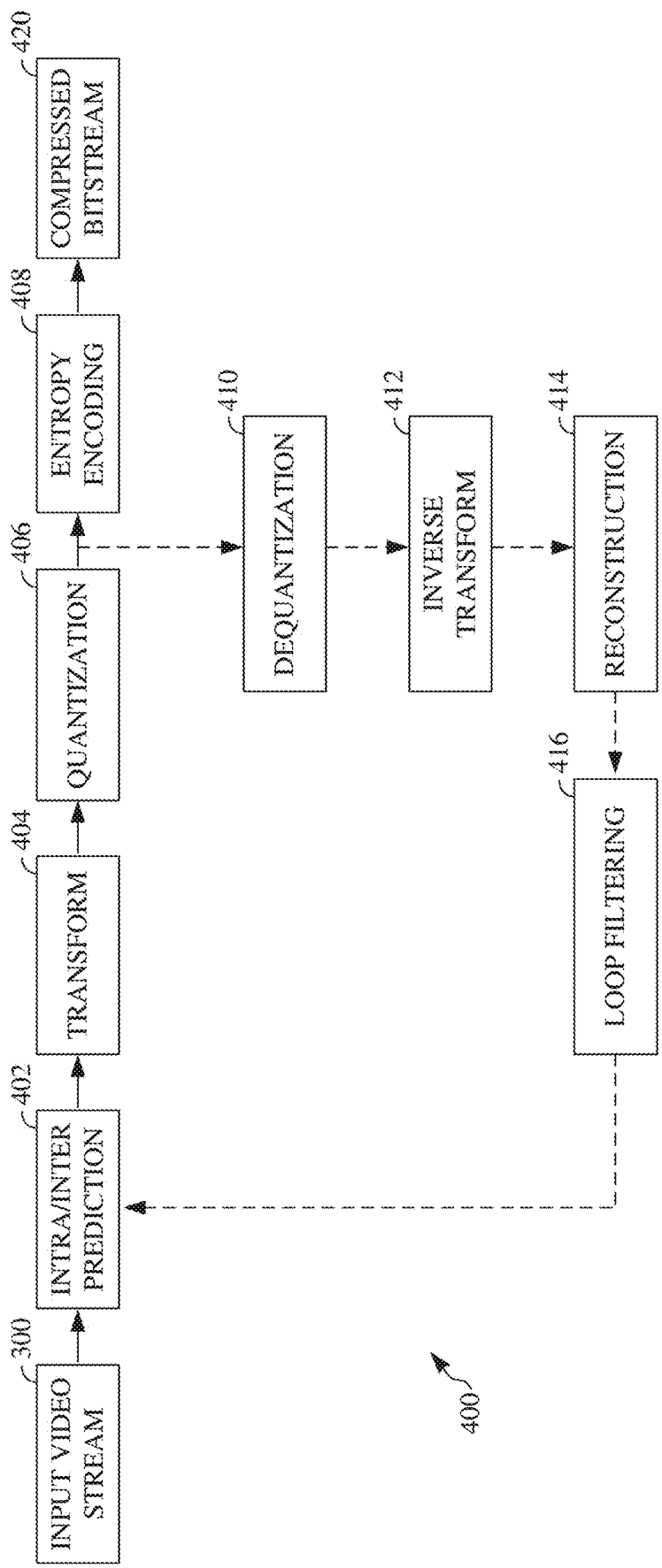
FIG. 4 is a block diagram of an encoder according to implementations of this disclosure.

FIG. 4 is a block diagram of an encoder 400 according to implementations of this disclosure. The encoder 400 can be implemented, as described above, in the transmitting station 102 such as by providing a computer software program stored in memory, for example, the memory 204. The computer software program can include machine instructions that, when executed by a processor such as the CPU 202, cause the transmitting station 102 to encode video data in the manner described in FIG. 4. The encoder 400 can also be implemented as specialized hardware included in, for example, the transmitting station 102. In one particularly desirable implementation, the encoder 400 is a hardware encoder.

The encoder 400 has the following stages to perform the various functions in a forward path (shown by the solid connection lines) to produce an encoded or compressed bitstream 420 using the video stream 300 as input: an intra/inter prediction stage 402, a transform stage 404, a quantization stage 406, and an entropy encoding stage 408. The encoder 400 may also include a reconstruction path (shown by the dotted connection lines) to reconstruct a frame for encoding of future blocks. In FIG. 4, the encoder 400 has the following stages to perform the various functions in the reconstruction path: a dequantization stage 410, an inverse transform stage 412, a reconstruction stage 414, and a loop filtering stage 416. Other structural variations of the encoder 400 can be used to encode the video stream 300.

When the video stream 300 is presented for encoding, respective frames 304, such as the frame 306, can be processed in units of blocks. At the intra/inter prediction stage 402, respective blocks can be encoded using intra-frame prediction (also called intra-prediction) or inter-frame prediction (also called inter-prediction). In any case, a prediction block can be formed. In the case of intra-prediction, a prediction block may be formed from samples in the current frame that have been previously encoded and reconstructed. In the case of inter-prediction, a prediction block may be formed from samples in one or more previously constructed reference frames. The designation of reference frames for groups of blocks is discussed in further detail below.

Next, still referring to FIG. 4, the prediction block can be subtracted from the current block at the intra/inter prediction stage 402 to produce a residual block (also called a residual). The transform stage 404 transforms the residual into transform coefficients in, for example, the frequency domain using block-based transforms. The quantization stage 406 converts the transform coefficients into discrete quantum values, which are referred to as quantized transform coefficients, using a quantizer value or a quantization level. For example, the transform coefficients may be divided by the quantizer value and truncated. The quantized transform coefficients are then entropy encoded by the entropy encoding stage 408. The entropy-encoded coefficients, together with other information used to decode the block, which may include for example the type of prediction used, transform type, motion vectors and quantizer value, are then output to the compressed bitstream 420. The compressed bitstream 420 can be formatted using various techniques, such as variable length coding (VLC) or arithmetic coding. The compressed bitstream 420 can also be referred to as an encoded video stream or encoded video bitstream, and the terms will be used interchangeably herein.

The reconstruction path in FIG. 4 (shown by the dotted connection lines) can be used to ensure that the encoder 400 and a decoder 500 (described below) use the same reference frames to decode the compressed bitstream 420. The reconstruction path performs functions that are similar to functions that take place during the decoding process that are discussed in more detail below, including dequantizing the quantized transform coefficients at the dequantization stage 410 and inverse transforming the dequantized transform coefficients at the inverse transform stage 412 to produce a derivative residual block (also called a derivative residual). At the reconstruction stage 414, the prediction block that was predicted at the intra/inter prediction stage 402 can be added to the derivative residual to create a reconstructed block. The loop filtering stage 416 can be applied to the reconstructed block to reduce distortion such as blocking artifacts.

Other variations of the encoder 400 can be used to encode the compressed bitstream 420. For example, a non-transform based encoder can quantize the residual signal directly without the transform stage 404 for certain blocks or frames. In another implementation, an encoder can have the quantization stage 406 and the dequantization stage 410 combined in a common stage.

Figure 5:
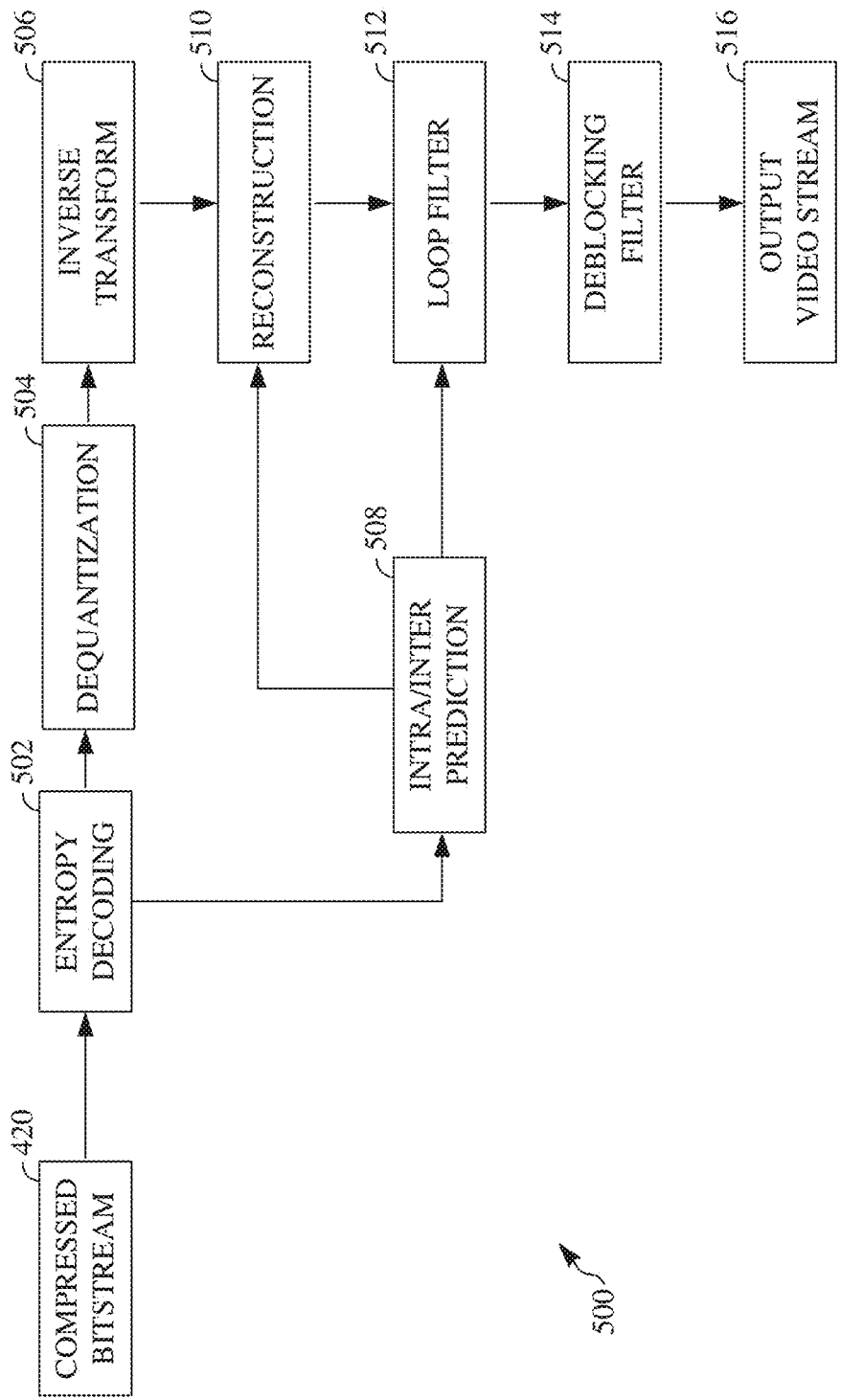
FIG. 5 is a block diagram of a decoder according to implementations of this disclosure.

FIG. 5 is a block diagram of a decoder 500 according to implementations of this disclosure. The decoder 500 can be implemented in the receiving station 106, for example, by providing a computer software program stored in the memory 204. The computer software program can include machine instructions that, when executed by a processor such as the CPU 202, cause the receiving station 106 to decode video data in the manner described in FIG. 5. The decoder 500 can also be implemented in hardware included in, for example, the transmitting station 102 or the receiving station 106.

The decoder 500, similar to the reconstruction path of the encoder 400 discussed above, includes in one example the following stages to perform various functions to produce an output video stream 516 from the compressed bitstream 420: an entropy decoding stage 502, a dequantization stage 504, an inverse transform stage 506, an intra/inter prediction stage 508, a reconstruction stage 510, a loop filtering stage 512 and a deblocking filtering stage 514. Other structural variations of the decoder 500 can be used to decode the compressed bitstream 420.

When the compressed bitstream 420 is presented for decoding, the data elements within the compressed bitstream 420 can be decoded by the entropy decoding stage 502 to produce a set of quantized transform coefficients. The dequantization stage 504 dequantizes the quantized transform coefficients (e.g., by multiplying the quantized transform coefficients by the quantizer value), and the inverse transform stage 506 inverse transforms the dequantized transform coefficients to produce a derivative residual that can be identical to that created by the inverse transform stage 412 in the encoder 400. Using header information decoded from the compressed bitstream 420, the decoder 500 can use the intra/inter prediction stage 508 to create the same prediction block as was created in the encoder 400, e.g., at the intra/inter prediction stage 402. At the reconstruction stage 510, the prediction block can be added to the derivative residual to create a reconstructed block. The loop filtering stage 512 can be applied to the reconstructed block to reduce blocking artifacts.

Other filtering can be applied to the reconstructed block. In this example, the deblocking filtering stage 514 is applied to the reconstructed block to reduce blocking distortion, and the result is output as the output video stream 516. The output video stream 516 can also be referred to as a decoded video stream, and the terms will be used interchangeably herein. Other variations of the decoder 500 can be used to decode the compressed bitstream 420. For example, the decoder 500 can produce the output video stream 516 without the deblocking filtering stage 514.

FIG. 6 is a block diagram of an example of a reference frame buffer 600. The reference frame buffer 600 stores reference frames used to encode or decode blocks of frames of a video sequence. In this example, the reference frame buffer 600 includes reference frames identified as a last frame LAST_FRAME 602, a golden frame GOLDEN_FRAME 604, and an alternative reference frame ALTREF_FRAME 606. A frame header of a reference frame may include a virtual index to a location within the reference frame buffer at which the reference frame is stored. A reference frame mapping may map the virtual index of a reference frame to a physical index of memory at which the reference frame is stored. Where two reference frames are the same frame, those reference frames will have the same physical index even if they have different virtual indexes. The number of reference positions within the reference frame buffer 600, the types, and the names used are examples only.

The reference frames stored in the reference frame buffer 600 can be used to identify motion vectors for predicting blocks of frames to be encoded or decoded. Different reference frames may be used depending on the type of prediction used to predict a current block of a current frame. For example, in bi-prediction, blocks of the current frame can be forward predicted using either frame stored as the LAST_FRAME 602 or the GOLDEN_FRAME 604, and backward predicted using a frame stored as the ALTREF_FRAME 606.

There may be a finite number of reference frames that can be stored within the reference frame buffer 600. As shown in FIG. 6, the reference frame buffer 600 can store up to eight reference frames, wherein each stored reference frame may be associated with a different virtual index of the reference frame buffer. Although three of the eight spaces in the reference frame buffer 600 are used by frames designated as the LAST_FRAME 602, the GOLDEN_FRAME 604, and the ALTREF_FRAME 606, five spaces remain available to store other reference frames. For example, one or more available spaces in the reference frame buffer 600 may be used to store further reference frames, in particular some or all of the interpolated reference frame described herein. Although the reference frame buffer 600 is shown as being able to store up to eight reference frames, other implementations of the reference frame buffer 600 may be able to store additional or fewer reference frames.

In some implementations, the alternative reference frame designated as the ALTREF_FRAME 606 may be a frame of a video sequence that is distant from a current frame in a display order, but is encoded or decoded earlier than it is displayed. For example, the alternative reference frame may be ten, twelve, or more (or fewer) frames after the current frame in a display order. Further alternative reference frames can be frames located nearer to the current frame in the display order.

An alternative reference frame may not correspond directly to a frame in the sequence. Instead, the alternative reference frame may be generated using one or more of the frames having filtering applied, being combined together, or being both combined together and filtered. An alternative reference frame may not be displayed. Instead, it can be a frame or portion of a frame generated and transmitted for use only in a prediction process (i.e., it is omitted when the decoded sequence is displayed).

FIG. 7 is a diagram of a group of frames in a display order of the video sequence. In this example, the group of frames is preceded by a frame 700, which can be referred to as a key frame or an overlay frame in some cases, and comprises eight frames 702-716. No block within the frame 700 is inter predicted using reference frames of the group of frames. The frame 700 is a key (also referred to as intra-predicted frame) in this example, which refers to its status that predicted blocks within the frame are only predicted using intra prediction. However, the frame 700 can be an overlay frame, which is an inter-predicted frame that can be a reconstructed frame of a previous group of frames. In an inter-predicted frame, at least some of the predicted blocks are predicted using inter prediction. The number of frames forming each group of frames can vary according to the video spatial/temporal characteristics and other encoded configurations, such as the key frame interval selected for random access or error resilience, for example.

The coding order for each group of frames can differ from the display order. This allows a frame located after a current frame in the video sequence to be used as a reference frame for encoding the current frame. A decoder, such as the decoder 500, may share a common group coding structure with an encoder, such as the encoder 400. The group coding structure assigns different roles that respective frames within the group may play in the reference buff (e.g., a last frame, an alternative reference frame, etc.) and defines or indicates the coding order for the frames within a group.

Figure 8:
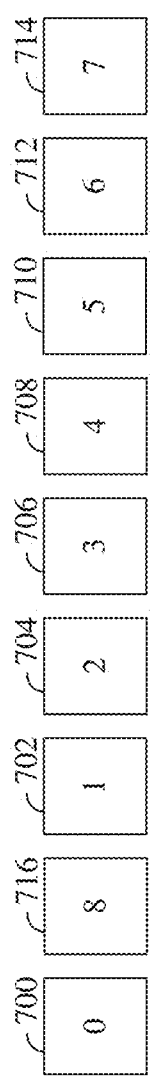
FIG. 8 is a diagram of an example of a coding order for the group of frames of FIG. 7.

FIG. 8 is a diagram of an example of a coding order for the group of frames of FIG. 7. The coding order of FIG. 8 is associated with a first group coding structure whereby a single backward reference frame is available for each frame of the group. Because the encoding and decoding order is the same, the order shown in FIG. 8 is generally referred to herein as a coding order. The key or overlay frame 700 is designated the golden frame in a reference frame buffer, such as the GOLDEN_FRAME 604 in the reference frame buffer 600. The frame 700 is intra-predicted in this example, so it does not require a reference frame, but an overlay frame as the frame 700, being a reconstructed frame from a previous group, also does not use a reference frame of the current group of frames. The final frame 716 in the group is designated an alternative reference frame in a reference frame buffer, such as the ALTREF_FRAME 606 in the reference frame buffer 600. In this coding order, the frame 716 is coded out of the display order after the frame 700 so as to provide a backward reference frame for each of the remaining frames 702-714. In coding blocks of the frame 716, the frame 700 serves as an available reference frame for blocks of the frame 716. FIG. 8 is only one example of a coding order for a group of frames. Other group coding structures may designate one or more different or additional frames for forward and/or backward prediction.

As mentioned briefly above, an available reference frame portion may be a reference frame portion that is interpolated using optical flow estimation. A reference frame portion may be a block, a slice, or an entire frame, for example. When frame-level optical flow estimation is performed as described herein, the resulting reference frame is referred to as a co-located reference frame herein because the dimensions are the same as the current frame. This interpolated reference frame may also be referred to herein as an optical flow reference frame.

Figure 9:
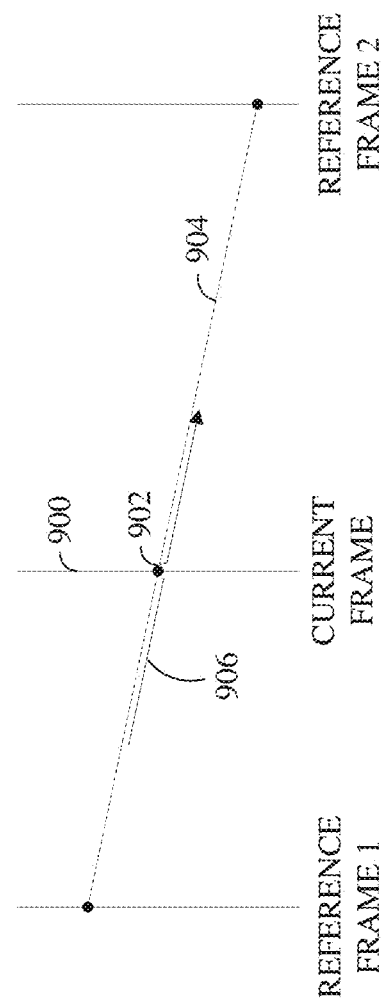
FIG. 9 is a diagram used to explain the linear projection of a motion field according to the teachings herein.

FIG. 9 is a diagram used to explain the linear projection of a motion field according to the teachings herein. Within a hierarchical coding framework, the optical flow (also called a motion field) of the current frame may be estimated using the nearest available reconstructed (e.g., reference) frames before and after the current frame. In FIG. 9, the reference frame 1 is a reference frame that may be used for forward prediction of the current frame 900, while the reference frame 2 is a reference frame that may be used for backward prediction of the current frame 900. Using the example of FIGS. 6-8 for illustration, if the current frame 900 is the frame 706, the immediately preceding, or last, frame 704 (e.g., the reconstructed frame stored in the reference frame buffer 600 as the LAST_FRAME 602) can be used as the reference frame 1, while the frame 716 (e.g., the reconstructed frame stored in the reference frame buffer 600 as the ALTREF_FRAME 606) can be used as the reference frame 2.

Knowing the display indexes of the current and reference frames, motion vectors may be projected between the pixels in the reference frames 1 and 2 to the pixels in the current frame 900 assuming that the motion field is linear in time. In the simple example described with regard to FIGS. 6-8, the index for the current frame 900 is 3, the index for the reference frame 1 is 0, and the index for the reference frame 2 is 716. In FIG. 9, a projected motion vector 904 for a pixel 902 of the current frame 900 is shown. Using the previous example in explanation, the display indexes of the group of frames of FIG. 7 would show that the frame 704 is temporally closer to the frame 706 than the frame 716. Accordingly, the single motion vector 904 shown in FIG. 9 represents a different amount of motion between reference frame 1 and the current frame 900 than between the reference frame 2 and the current frame 900. Nevertheless, the projected motion field 906 is linear between the reference frame 1, the current frame 900, and the reference frame 2.

Selecting the nearest available reconstructed forward and backward reference frames and assuming a motion field for respective pixels of the current frame that is linear in time allows generation of the interpolated reference frame using optical flow estimation to be performed at both an encoder and a decoder (e.g., at the intra/inter prediction stage 402 and the intra/inter prediction stage 508) without transmitting extra information. Instead of the nearest available reconstructed reference frames, it is possible that different frames may be used as designated a priori between the encoder and decoder. In some implementations, identification of the frames used for the optical flow estimation may be transmitted. Generation of the interpolated frame is discussed in more detail below.

Figure 10:
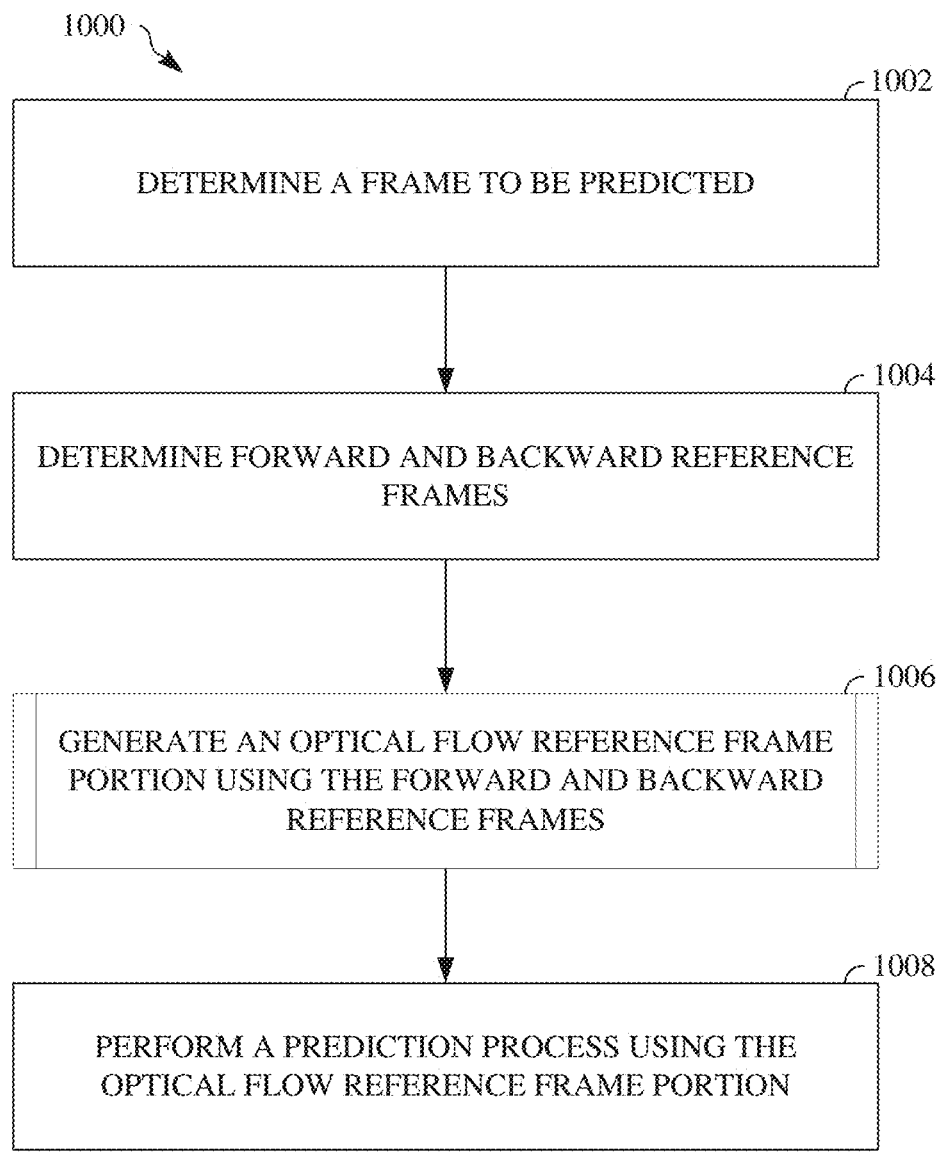
FIG. 10 is a flowchart diagram of a process for motion compensated prediction of a video frame using at least a portion of a reference frame generated using optical flow estimation.

FIG. 10 is a flowchart diagram of a method or process 1000 for motion compensated prediction of a frame of a video sequence using at least a portion of a reference frame generated using optical flow estimation. The reference frame portion may be a block, a slice, or an entire reference frame, for example. An optical flow reference frame portion may also be referred to as a co-located reference frame portion herein. The process 1000 can be implemented, for example, as a software program that may be executed by computing devices such as transmitting station 102 or receiving station 106. For example, the software program can include machine-readable instructions that may be stored in a memory such as the memory 204 or the secondary storage 214, and that, when executed by a processor, such as CPU 202, may cause the computing device to perform the process 1000. The process 1000 can be implemented using specialized hardware or firmware. Some computing devices may have multiple memories or processors, and the operations described in the process 1000 can be distributed using multiple processors, memories, or both.

At 1002, a current frame to be predicted is determined. Frames may be coded, and hence predicted, in any order, such as in the coding order shown in FIG. 8. The frames to be predicted may also be referred to as a first, second, third, etc. frame. The label of first, second, etc. does not necessarily indicate an order of the frames. Instead the label is used to distinguish one current frame from another herein unless otherwise stated. At an encoder, the frame may be processed in units of blocks in a block coding order, such as a raster scan order. At a decoder, the frame may also be processed in units of blocks according to receipt of their encoded residuals within an encoded bitstream.

At 1004, forward and backward reference frames are determined. In the examples described herein, the forward and backward reference frames are the nearest reconstructed frames before and after (e.g., in display order) the current frame, such as the current frame 900. Although not expressly shown in FIG. 10, if either a forward or backward reference frame does not exist, the process 1000 ends. The current frame is then processed without considering optical flow.

Provided that forward and backward reference frames exist at 1004, an optical flow reference frame portion may be generated using the reference frames at 1006. Generating the optical flow reference frame portion is described in more detail with reference to FIGS. 11-14. The optical flow reference frame portion may be stored at a defined position within the reference frame buffer 600 in some implementations. Initially, optical flow estimation according to the teachings herein is described.

Optical flow estimation may be performed for respective pixels of a current frame portion by minimizing the following Lagrangian function (1):

$$J = J_{data} + \lambda J_{spatial} \quad (1)$$

In the function (1), $J_{data}$ is the data penalty based on the brightness constancy assumption (i.e., the assumption that an intensity value of a small portion of an image remains unchanged over time despite a position change). $J_{spatial}$ is the spatial penalty based on the smoothness of the motion field (i.e., the characteristic that neighboring pixels likely belong to the same object item in an image, resulting in substantial the same image motion). The Lagrangian parameter λ controls the importance of the smoothness of the motion field. A large value for the parameter λ results in a smoother motion field and can better account for motion at a larger scale. In contrast, a smaller value for the parameter λ may more effectively adapt to object edges and the movement of small objects.

According to an implementation of the teachings herein, the data penalty may be represented by the data penalty function:

$$J_{data} = (E_x u + E_y v + E_t) \quad (2)$$

The horizontal component of a motion field for a current pixel is represented by u, while the vertical component of the motion field is represented by v. Broadly stated, $E_x$, $E_y$, and $E_t$ are derivatives of pixel values of reference frame portions with respect to the horizontal axis x, the vertical axis y, and time t (e.g., as represented by frame indexes). The horizontal axis and the vertical axis are defined relative to the array of the pixels forming the current frame, such as the current frame 900, and the reference frames, such as the reference frames 1 and 2.

In the data penalty function, the derivatives $E_x$, $E_y$, and $E_t$ may be calculated according to the following functions (3), (4), and (5):

$$E_x = (index_{r2} - index_{cur})/(index_{r2} - index_{r1}) \cdot E_x^{(r1)} + (index_{cur} - index_{r1})/(index_{r2} - index_{r1}) \cdot E_x^{(r2)} \quad (3)$$

$$E_y = (index_{cur} - index_{r1})/(index_{r2} - index_{r1}) \cdot E_y^{(r1)} + (index_{cur} - index_{r1})/(index_{r2} - index_{r1}) \cdot E_y^{(r2)} \quad (4)$$

$$E_t = E^{(r2)} - E^{(r1)} \quad (5)$$

The variable $E^{(r1)}$ is a pixel value at a projected position in the reference frame 1 based on the motion field of the current pixel location in the current frame being encoded. Similarly, the variable $E^{(r2)}$ is a pixel value at a projected position in the reference frame 2 based on the motion field of the current pixel location in the current frame being encoded.

The variable $index_{r1}$ is the display index of the reference frame 1, where the display index of a frame is its index in the display order of the video sequence. Similarly, the variable index$_{r2}$ is the display index of the reference frame 2, and the variable index$_{cur}$ is the display index of the current frame 900.

The variable $E_x^{(r1)}$ is the horizontal derivative calculated at the reference frame 1 using a linear filter. The variable $E_x^{(r2)}$ is the horizontal derivative calculated at the reference frame 2 using a linear filter. The variable $E_y^{(r1)}$ is the vertical derivative calculated at the reference frame 1 using a linear filter. The variable $E_y^{(r2)}$ is the vertical derivative calculated at the reference frame 2 using a linear filter.

In an implementation of the teachings herein, the linear filter used for calculating the horizontal derivative is a 7-tap filter with filter coefficients [−1/60, 9/60, −45/60, 0, 45/60, −9/60, 1/60]. The filter can have a different frequency profile, a different number of taps, or both. The linear filter used for calculating the vertical derivatives may be the same as or different from the linear filter used for calculating the horizontal derivatives.

The spatial penalty may be represented by the spatial penalty function:

$$J_{spatial} = (\Delta u)^2 + (\Delta v)^2 \quad (6)$$

In the spatial penalty function (6), $\Delta u$ is the Laplacian of the horizontal component u of the motion field, and $\Delta v$ is the Laplacian of the vertical component v of the motion field.

Figure 11:
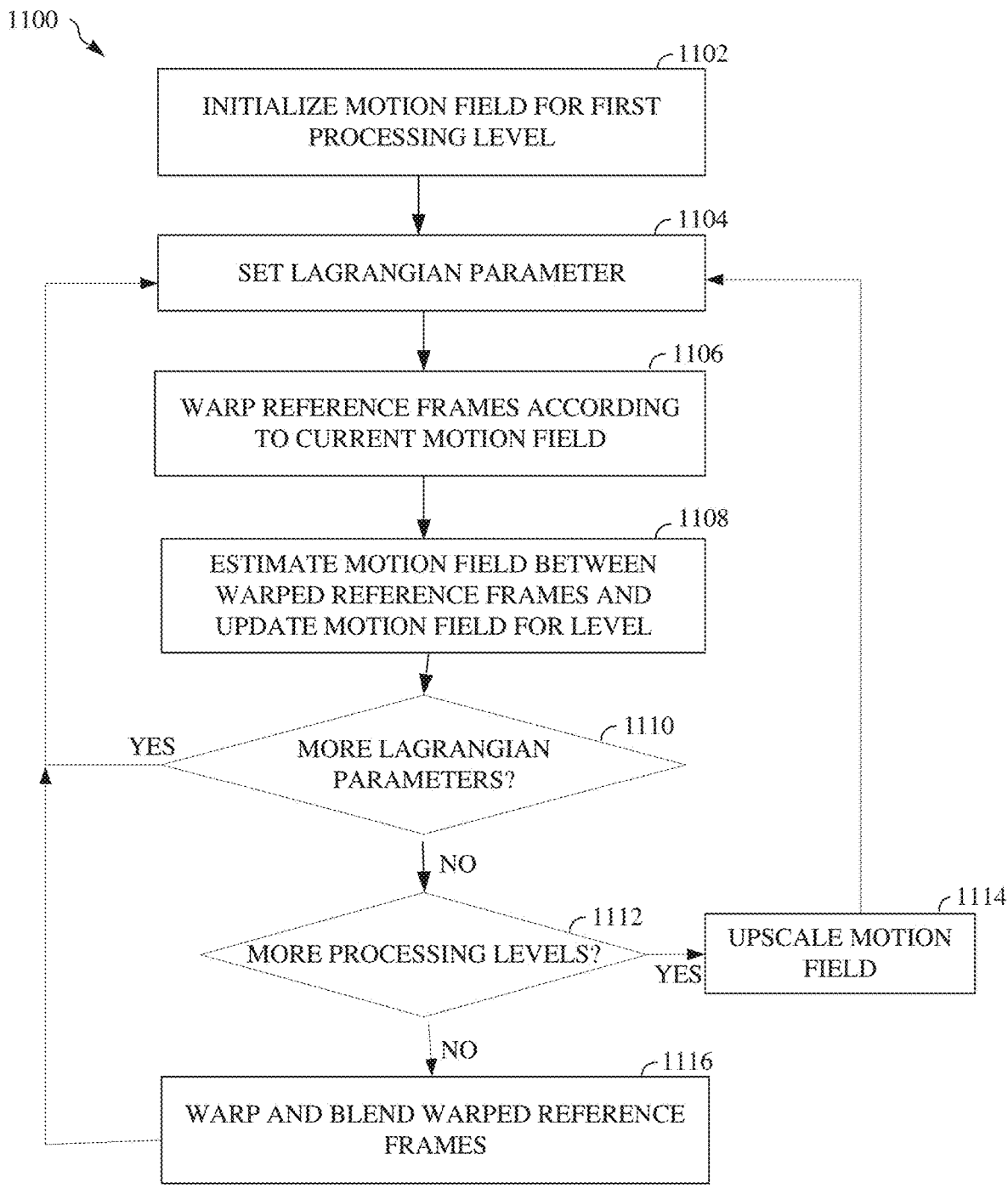
FIG. 11 is a flowchart diagram of a process for generating an optical flow reference frame portion.

FIG. 11 is a flowchart diagram of a method or process 1100 for generating an optical flow reference frame portion. In this example, the optical flow reference frame portion is an entire reference frame. The process 1100 can implement step 1006 of the process 1000. The process 1100 can be implemented, for example, as a software program that may be executed by computing devices such as transmitting station 102 or receiving station 106. For example, the software program can include machine-readable instructions that may be stored in a memory such as the memory 204 or the secondary storage 214, and that, when executed by a processor, such as CPU 202, may cause the computing device to perform the process 1100. The process 1100 can be implemented using specialized hardware or firmware. As described above, multiple processors, memories, or both, may be used.

Because the forward and backward reference frames can be relatively distant from each other, there may be dramatic motion between them, reducing the accuracy of the brightness constancy assumption. To reduce the potential errors in the motion of a pixel resulting from this problem, the estimated motion vectors from the current frame to the reference frames can be used to initialize the optical flow estimation for the current frame. At 1102, all pixels within the current frame may be assigned an initialized motion vector. They define initial motion fields that can be utilized to warp the reference frames to the current frame for a first processing level to shorten the motion lengths between reference frames.

The motion field mv$_{cur}$ of a current pixel may be initialized using a motion vector that represents a difference between the estimated motion vector mv$_{r2}$ pointing from the current pixel to the backward reference frame, in this example reference frame 2, and the estimated motion vector mv$_{r1}$ pointing from the current pixel to the forward reference frame, in this example reference frame 1, according to:

$$mv_{cur} = -mv_{r1} + mv_{r2}$$

If one of the motion vectors is unavailable, it is possible to extrapolate the initial motion using the available motion vector according to one of the following functions:

$$mv_{cur} = -mv_{r1} \cdot (index_{r2} - index_{r1})/(index_{cur} - index_{r1}), \text{ or}$$

$$mv_{cur} = mv_{r2} \cdot (index_{r2} - index_{r1})/(index_{r2} - index_{cur}).$$

Where a current pixel has neither motion vector reference available, one or more spatial neighbors having an initialized motion vector may be used. For example, an average of the available neighboring initialized motion vectors may be used.

In an example of initializing the motion field for a first processing level at 1102, reference frame 2 may be used to predict a pixel of reference frame 1, where reference frame 1 is the last frame before the current frame being coded. That motion vector, projected on to the current frame using linear projection in a similar manner as shown in FIG. 9, results in a motion field mv$_{cur}$ at the intersecting pixel location, such as the motion field 906 at the pixel location 902.

FIG. 11 refers to initializing the motion field for a first processing level because there are desirably multiple processing levels to the process 1100. This can be seen by reference to FIG. 13, which is a diagram that illustrates the process 1100 of FIG. 11 (and the process 1200 of FIG. 12 discussed below). The following description uses the phrase motion field. This phrase is intended to collectively refer to the motion fields for respective pixels unless otherwise clear from the context. Accordingly, the phrases "motion fields" or "motion field" may be used interchangeably when referring to more than one motion field. Further, the phrase optical flow may be used interchangeably with the phrase motion field when referring to the movement of pixels.

To estimate the motion field/optical flow for pixels of a frame, a pyramid, or multi-layered, structure may be used. In one pyramid structure, for example, the reference frames are scaled down to one or more different scales. Then, the optical flow is first estimated to obtain a motion field at the highest level (the first processing level) of the pyramid, i.e., using the reference frames that are scaled the most. Thereafter, the motion field is up-scaled and used to initialize the optical flow estimation at the next level. This process of upscaling the motion field, using it to initialize the optical flow estimation of the next level, and obtaining the motion field continues until the lowest level of the pyramid is reached (i.e., until the optical flow estimation is completed for the reference frame portions at full scale).

The reasoning for this process is that it is easier to capture large motion when an image is scaled down. However, using simple rescale filters for scaling the reference frames themselves can degrade the reference frame quality. To avoid losing the detailed information due to rescaling, a pyramid structure that scales derivatives instead of the pixels of the reference frames to estimate the optical flow can be used. This pyramid scheme represents a regressive analysis for the optical flow estimation. The scheme is shown in FIG. 13 and is implemented by the process 1100 of FIG. 11 and the process 1200 of FIG. 12.

After initialization, the Lagrangian parameter $\lambda$ is set for solving the Lagrangian function (1) at 1104. Desirably, the process 1100 uses multiple values for the Lagrangian parameter λ. The first value at which the Lagrangian parameter $\lambda$ is set at 1104 may be a relatively large value, such as 100. While it is desirable that the process 1100 uses multiple values for the Lagrangian parameter $\lambda$ within the Lagrangian function (1), it is possible that only one value is used as described in the process 1200 described below.

At 1106, the reference frames are warped to the current frame according to the motion field for the current processing level. Warping the reference frames to the current frame may be performed using subpixel location rounding. It is worth noting that the motion field $mv_{cur}$ that is used at the first processing level is downscaled from its full resolution value to the resolution of the level before performing the warping. Downscaling a motion field is discussed in more detail below.

Knowing the optical flow $mv_{cur}$, the motion field to warp reference frame 1 is inferred by the linear projection assumption (e.g., that the motion projects linearly over time) as follows:

$$mv_{r1}=(index_{cur}-index_{r1})/(index_{r2}-index_{r1})\cdot mv_{cur}$$

To perform warping, the horizontal component $U_{r1}$ and the vertical component $v_{r1}$ of the motion field $mv_{r1}$ may be rounded to ⅛ pixel precision for the Y component and 1/16 pixel precision for the U and V component. Other values for the subpixel location rounding may be used. After rounding, each pixel in a warped image $E_{warped}^{(r1)}$ is calculated as the referenced pixel given by the motion vector $mv_{r1}$. Subpixel interpolation may be performed using a conventional subpixel interpolation filter.

The same warping approach is done for reference frame 2 to get a warped image $E_{warped}^{(r2)}$, where the motion field is calculated by:

$$mv_{r2}=(index_{r2}-index_{cur})/(index_{r2}-index_{r1})\cdot mv_{cur}$$

At the end of the calculations at 1106, two warped reference frames exist. The two warped reference frames are used to estimate the motion field between them at 1108. Estimating the motion field at 1108 can include multiple steps.

First, the derivatives $E_x$, $E_y$, and $E_t$ are calculated using the functions (3), (4), and (5). When calculating the derivatives, the frame boundaries of a warped reference frame may be expanded by copying the nearest available pixel. In this way, pixel values (i.e., $E^{(r1)}$ and/or $E^{(r2)}$) may be obtained when projected positions are outside of the warped reference frame. Then, if there are multiple layers, the derivatives are downscaled to the current level. As shown in FIG. 13, the reference frames are used to calculate the derivatives at the original scale to capture details. Downscaling the derivatives at each level l may be calculated by averaging within a $2^l$ by $2^l$ block. It is worth noting that, because calculating the derivatives as well as downscaling by averaging them are both linear operations, the two operations may be combined in a single linear filter to calculate the derivatives at each level l. This can lower complexity of the calculations.

Once the derivatives are downscaled to the current processing level, as applicable, optical flow estimation can be performed according to the Lagrangian function (1). More specifically, by setting the derivatives of the Lagrangian function (1) with respect to the horizontal component u of the motion field and the vertical component v of the motion field to zero (i.e., $\partial J/\partial u=0$ and $\partial J/\partial v=0$), the components u and v may be solved for all N pixels of a frame with 2*N linear equations. This results from the fact that the Laplacians are approximated by two-dimensional (2D) filters. Instead of directly solving the linear equations, which is accurate but highly complex, iterative approaches may be used to minimize the Lagrangian function (1) with faster but less accurate results.

At 1108, the motion field for pixels of the current frame is updated or refined using the estimated motion field between the warped reference frames. For example, the current motion field for a pixel may be updated by adding the estimated motion field for a pixel on a pixel-by-pixel basis.

Once the motion field is estimated at 1108, a query is made at 1110 to determine whether there are additional values for the Lagrangian parameter λ available. Smaller values for the Lagrangian parameter λ can address smaller scales of motion. If there are additional values, the process 1100 can return to 1104 to set the next value for the Lagrangian parameter λ. For example, the process 1100 can repeat while reducing the Lagrangian parameter λ by half in each iteration. The motion field updated at 1108 is the current motion field for warping the reference frames at 1106 in this next iteration. Then, the motion field is again estimated at 1108. The processing at 1104, 1106, and 1108 continues until all of the possible Lagrangian parameters at 1110 are processed. In an example, there are three levels to the pyramid as shown in FIG. 13, so the smallest value for the Lagrangian parameter λ is 25 in an example. This repeating processing while modifying the Lagrangian parameter may be referred to as annealing the Lagrangian parameter.

Once there are no remaining values for the Lagrangian parameter λ at 1110, the process 1100 advances to 1112 to determine whether there are more processing levels to process. If there are additional processing levels at 1112, the process 1100 advances to 1114, where the motion field is up-scaled before processing the next layer using each of the available values for the Lagrangian parameter λ starting at 1104. Upscaling the motion field may be performed using any known technique, including but not limited to the reverse of the downscaling calculations described previously.

In general, the optical flow is first estimated to obtain a motion field at the highest level of the pyramid. Thereafter, the motion field is upscaled and used to initialize the optical flow estimation at the next level. This process of upscaling the motion field, using it to initialize the optical flow estimation of the next level, and obtaining the motion field continues until the lowest level of the pyramid is reached (i.e., until the optical flow estimation is completed for the derivatives calculated at full scale) at 1112.

Once the level is at the level where the reference frames are not downscaled (i.e., they are at their original resolution), the process 1100 advances to 1116. For example, the number of levels can be three, such as in the example of FIG. 13. At 1116, the warped reference frames are blended to form the optical flow reference frame $E^{(cur)}$. Note that the warped reference frames blended at 1116 may be the full-scale reference frames that are warped again according to the process described at 1106 using the motion field estimated at 1108. In other words, the full-scale reference frames may be warped twice—once using the initial up-scaled motion field from the previous layer of processing and again after the motion field is refined at the full-scale level. The blending may be performed using the time linearity assumption (e.g., that frames are spaced apart by equal time periods) as follows:

$$E^{(cur)}=E_{warped}^{(r1)}\cdot(index_{r2}-index_{cur})/(index_{r2}-index_{r1})+E_{warped}^{(r2)}\cdot(index_{cur}-index_{r1})/(index_{r2}-index_{r1})$$

In some implementations, it is desirable to prefer the pixel in only one of the warped reference frames rather than the blended value. For example, if a reference pixel in the reference frame 1 (represented by $mv_{r1}$) is out of bounds (e.g., outside of the dimensions of the frame) while the reference pixel in the reference frame 2 is not, then only the pixel in the warped image resulting from the reference frame 2 is used according to:

$$E^{(cur)} = E_{warped}^{(r2)}$$

Optional occlusion detection may be performed as part of the blending. Occlusion of objects and background commonly occurs in a video sequence, where parts of the object appear in one reference frame but are hidden in the other. Generally, the optical flow estimation method described above cannot estimate the motion of the object in this situation because the brightness constancy assumption is violated. If the size of the occlusion is relatively small, the smoothness penalty function may estimate the motion quite accurately. That is, if the undefined motion field at the hidden part is smoothed by the neighboring motion vectors, the motion of the whole object can be accurate.

Even in this case, however, the simple blending method described above may not give us satisfactory interpolated results. This can be demonstrated by reference to FIG. 14, which is a diagram that illustrates object occlusion. In this example, the occluded part of object A shows in reference frame 1 and is hidden by object B in reference frame 2. Because the hidden part of object A is not shown in reference frame 2, the referenced pixel from reference frame 2 is from object B. In this case, using only the warped pixel from the reference frame 1 is desirable. Accordingly, using a technique that detects occlusions, instead of or in addition to the above blending, may provide a better blending result, and hence a better reference frame.

Figure 14:
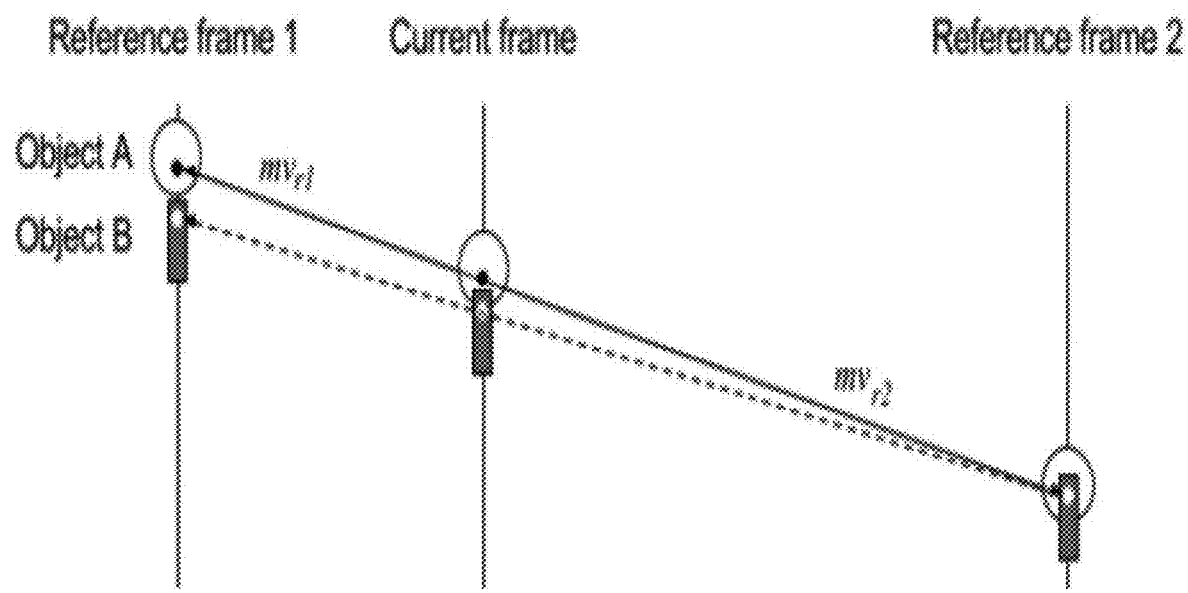
FIG. 14 is a diagram illustrating object occlusion.

Regarding detection of an occlusion, observe from FIG. 14 that when occlusion occurs and the motion field is fairly accurate, the motion vector of the occluded part of object A points to object B in reference frame 2. This may result in the following situations. The first situation is that the warped pixel values $E_{warped}^{(r1)}$ and $E_{warped}^{(r2)}$ are very different because they are from two different objects. The second situation is that the pixels in object B are referenced by multiple motion vectors, which are for object B in the current frame and for the occluded part of object A in the current frame.

With these observations, the following conditions may be established to determine occlusion and use of only $E_{warped}^{(r2)}$ for $E^{cur}$, where similar conditions apply for using only $E_{warped}^{(r2)}$ for $E^{cur}$:

$|E_{warped}^{(r1)} - E_{warped}^{(r2)}|$ is greater than a threshold $T_{pixel}$; and $N_{ref}^{(r2)}/N_{ref}^{(r1)}$ is greater than a threshold $T_{ref}$.

$N_{ref}^{(r2)}$ is the total number of times that the referenced pixel in the reference frame 1 is referenced by any pixel in the current co-located frame. Given the existence of subpixel interpolation described above, $N_{ref}^{(r2)}$ is counted when the reference subpixel location is within one pixel length of the interested pixel location. Moreover, if $mv_{r2}$ points to a subpixel location, the weighted average of $N_{ref}^{(r2)}$ of the four neighboring pixels as the total number of references for the current subpixel location. $N_{ref}^{(r1)}$ may be similarly defined.

Accordingly, an occlusion can be detected in the first reference frame using the first warped reference frame and the second warped reference frame. Then, the blending of the warped reference frames can include populating pixel positions of the optical flow reference frame corresponding to the occlusion with pixel values from the second warped reference frame. Similarly, an occlusion can be detected in the second reference frame using the first warped reference frame and the second warped reference frame. Then, the blending of the warped reference frames can include populating pixel positions of the optical flow reference frame corresponding to the occlusion with pixel values from the first warped reference frame It is experimentally shown that the process 1100 provides substantial compression performance gains. These performance gains include 2.5% gains in PSNR and 3.3% in SSIM for a low-resolution set of frames, and 3.1% in PSNR and 4.0% in SSIM for a mid-resolution set of frames). However, and as mentioned above, the optical flow estimation performed according to the Lagrangian function (1) uses 2*N linear equations to solve the horizontal component u and the vertical component v of the motion field for all N pixels of a frame. In other words, the computational complexity of optical flow estimation is a polynomial function of the frame size, which impose a burden on the decoder complexity. Accordingly, a sub-frame based (e.g., a block-based) optical flow estimation is next described, which can reduce the decoder complexity over the frame-based optical flow estimation described with regard to FIG. 11.

Figure 12:
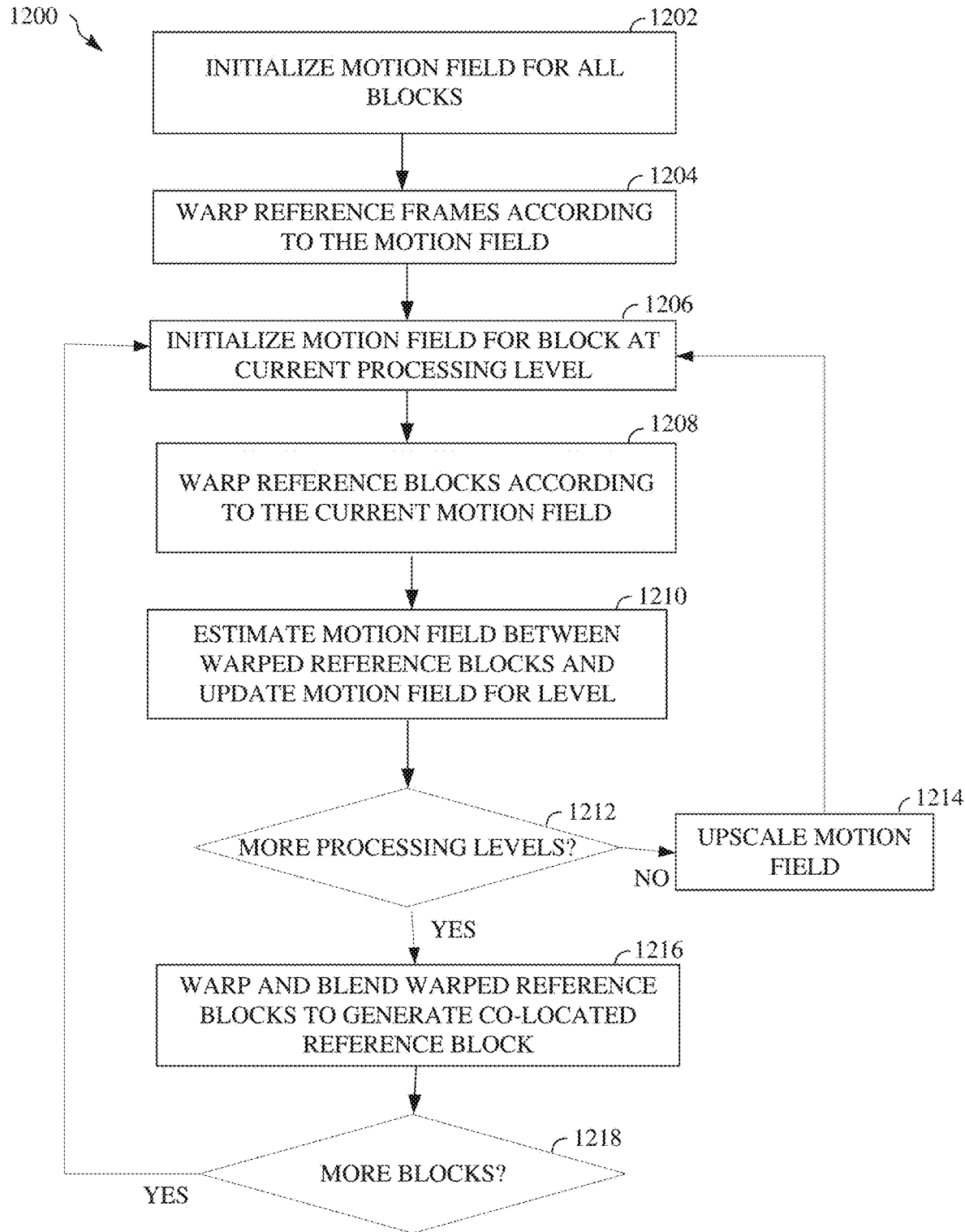
FIG. 12 is a flowchart diagram of another process for generating an optical flow reference frame portion.
Figure 13:
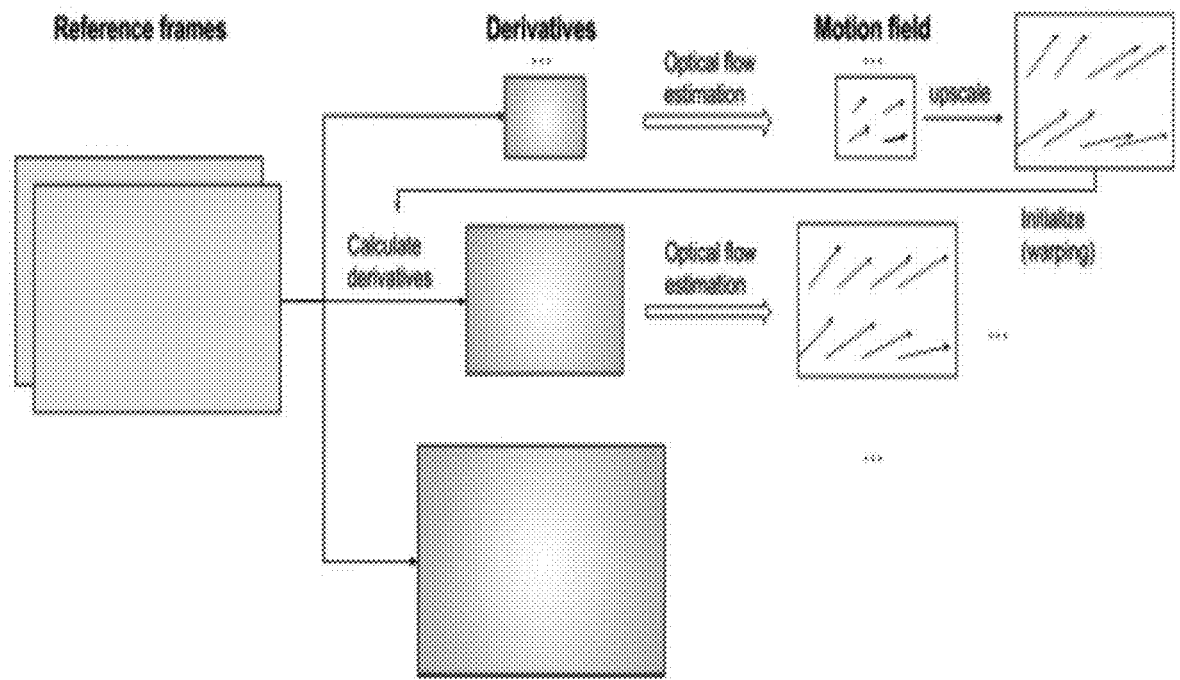
FIG. 13 is a diagram illustrating the processes of FIGS. 11 and 12.

FIG. 12 is a flowchart diagram of a method or process 1200 for generating an optical flow reference frame portion. In this example, the optical flow reference frame portion is less than an entire reference frame. The co-located frame portions in this example are described with reference to a block, but other frame portions may be processed according to FIG. 12. The process 1200 can implement step 1006 of the process 1000. The process 1200 can be implemented, for example, as a software program that may be executed by computing devices such as transmitting station 102 or receiving station 106. For example, the software program can include machine-readable instructions that may be stored in a memory such as the memory 204 or the secondary storage 214, and that, when executed by a processor, such as CPU 202, may cause the computing device to perform the process 1200. The process 1200 can be implemented using specialized hardware or firmware. As described above, multiple processors, memories, or both, may be used.

At 1202, all pixels within the current frame are assigned an initialized motion vector. They define initial motion fields that can be utilized to warp the reference frames to the current frame for a first processing level to shorten the motion lengths between reference frames. The initialization at 1202 can be performed using the same processing as described with regard to the initialization at 1102, so the description is not repeated here.

At 1204, the reference frames—such as the reference frames 1 and 2—are warped to the current frame according to the motion field initialized at 1202. The warping at 1204 can be performed using the same processing as described with regard to the warping at 1106 except that, desirably, the motion field $mv_{cur}$ initialized at 1202 is not downscaled from its full resolution value before warping the reference frames.

At the end of the calculations at 1204, two warped reference frames at full resolution exist. Like the process 1100, the process 1200 can estimate the motion field between the two reference frames using a multi-level process similar to that described with regard to FIG. 13. Broadly stated, the process 1200 calculates the derivatives for a level, performs an optical flow estimation using the derivatives, and upscales the resulting motion field for the next level until all levels are considered.

More specifically, the motion field $mv_{cur}$ for a block at the current (or first) processing level is initialized at 1206. The block may be a block of the current frame selected in a scan order (e.g., a raster scan order) of the current frame. The motion field $mv_{cur}$ for the block comprises the motion field for respective pixels of the block. In other words, at 1206, all pixels within a current block are assigned an initialized motion vector. The initialized motion vectors are used to warp reference blocks to the current block to shorten the lengths between the reference blocks in the reference frames.

At 1206, the motion field $mv_{cur}$ is downscaled from its full resolution value to the resolution of the level. In other words, the initialization at 1206 may comprise downscaling the motion field for respective pixels of the block from the full resolution values that were initialized at 1202. Downscaling may be performed using any technique, such as the downscaling described above.

At 1208, co-located reference blocks corresponding to the motion field in each of the warped reference frames are warped to the current block. Warping the reference blocks is performed similarly to the process 1100 at 1106. That is, knowing the optical flow $mv_{cur}$ of pixels of the reference block in reference frame 1, the motion field for warping is inferred by the linear projection assumption (e.g., that the motion projects linearly over time) as follows:

$$mv_{r1} = (index_{cur} - index_{r1})/(index_{r2} - index_{r1}) \cdot mv_{cur}$$

To perform warping, the horizontal component $u_{r1}$ and the vertical component $u_{r1}$ of the motion field $mv_{r1}$ may be rounded to ⅛ pixel precision for the Y component and 1/16 pixel precision for the U and V component. Other values may be used. After rounding, each pixel in a warped block, e.g., $E_{warped}^{(r1)}$, is calculated as the referenced pixel given by the motion vector $mv_{r1}$. Subpixel interpolation may be performed using a conventional subpixel interpolation filter.

The same warping approach is done for the reference block of reference frame 2 to get a warped block, e.g., $E_{warped}^{(r2)}$, where the motion field is calculated by:

$$mv_{r2} = (index_{r2} - index_{cur})/(index_{r2} - index_{r1}) \cdot mv_{cur}$$

At the end of the calculations at 1208, two warped reference blocks exist. The two warped reference blocks are used to estimate the motion field between them at 1210. The processing at 1210 can be similar to that described with regard to the processing at 1108 in FIG. 11.

More specifically, the two warped reference blocks may be at full resolution. According to the pyramid structure at FIG. 13, the derivatives $E_x$, $E_y$, and $E_t$ are calculated using the functions (3), (4), and (5). When calculating the derivatives for frame-level estimation, the frame boundaries may be expanded by copying the nearest available pixel to obtain out-of-bound pixel values as described with regard to the process 1100. However, for other frame portions, neighboring pixels are often available in the reference frames warped at 1204. For example, for block-based estimation, the pixels of neighboring blocks are available in the warped reference frames unless the block itself is at a frame boundary. Accordingly, for out-of-bounds pixels relative to a warped reference frame portion, pixels in neighboring portions of the warped reference frame may be used as the pixel values $E^{(r1)}$ and $E^{(r2)}$, as applicable. If the projected pixels are outside of the frame boundaries, copying the nearest available (i.e., within bounds) pixel may still be used. After the derivatives are calculated, they may be downscaled to the current level. The downscaled derivatives at each level l may calculated by averaging within a $2^l$ by $2^l$ block, as discussed previously. The complexity of the calculations may be reduced by combining the two linear operations of calculating and averaging the derivatives in a single linear filter, but this is not required.

Continuing with the processing at 1210, the downscaled derivatives can be used as inputs to the Lagrangian function (1) to perform optical flow estimation to estimate the motion field between the warped reference portions. The horizontal component u and the vertical component v of the motion field for all N pixels of a portion, here a block, may be determined by setting the derivatives of the Lagrangian function (1) with respect to the horizontal component u and the vertical component v to zero (i.e., $\partial J/\partial u = 0$ and $\partial J/\partial v = 0$), and solving the 2*N linear equations. For this, there are two optional ways to address out-of-bound motion vectors. One way is to assume zero correlation with neighboring blocks and assume a out-of-bound motion vector is the same as a motion vector at the nearest boundary location to the out-of-bound pixel location. Another way is to use the initialized motion vector for the current pixel (i.e., the motion field initialized at 1206) as the motion vector for an out-of-bound pixel location corresponding to the current pixel.

After the motion field is estimated, the current motion field for the level is updated or refined using the estimation motion field between the warped reference blocks to complete the processing at 1210. For example, the current motion field for a pixel may be updated by adding the estimated motion field for a pixel on a pixel-by-pixel basis.

In the process 1100, an additional loop is included to set decreasing values for the Lagrangian parameter λ such that, at each level, the motion field is estimated and refined using increasingly smaller values for the Lagrangian parameter λ. In the process 1200, this loop is omitted. That is, in the process 1200 as shown, only one value for the Lagrangian parameter λ is used to estimate the motion field at a current processing level. This can be a relatively small value, such as 25. Other values for the Lagrangian parameter λ are possible, e.g., depending upon the smoothness of the motion, the image resolution, or other variables.

In other implementations, the process 1200 can include the additional loop for varying the Lagrangian parameter λ. In an implementation where such a loop is included, the Lagrangian parameter λ may be set before estimating the motion field at 1210 such that warping the reference blocks at 1208 and estimating and updating the motion field at 1210 are repeated until all values for the Lagrangian parameter λ have been used as described with respect to the processing at 1104 and 1110 in the process 1100.

The process 1200 advances to the query of 1212 after estimating and updating the motion field at 1210. This is done after the first and only motion field estimation and update at a level at 1210 when a single value for the Lagrangian parameter λ is used. When multiple values for the Lagrangian parameter λ are modified at a processing level, the process 1200 advances to the query of 1212 after estimating and updating the motion field at 1210 using the final value for the Lagrangian parameter λ.

If there are additional processing levels in response to the query at 1212, the process 1200 advances to 1214, where the motion field is up-scaled before processing the next layer starting at 1206. Upscaling may be performed according to any known technique.

In general, the optical flow is first estimated to obtain a motion field at the highest level of the pyramid. Thereafter, the motion field is upscaled and used to initialize the optical flow estimation at the next level. This process of upscaling the motion field, using it to initialize the optical flow estimation of the next level, and obtaining the motion field continues until the lowest level of the pyramid is reached (i.e., until the optical flow estimation is completed for the derivatives calculated at full scale) at 1212.

Once the level is at the level where the reference frames are not downscaled (i.e., they are at their original resolution), the process 1200 advances to 1216. For example, the number of levels can be three, such as in the example of FIG. 13. At 1216, the warped reference blocks are blended to form an optical flow reference block (e.g., $E^{(cur)}$ as described previously). Note that the warped reference blocks blended at 1216 may be the full-scale reference blocks that are warped again according to the process described at 1208 using the motion field estimated at 1210. In other words, the full-scale reference blocks may be warped twice-once using the initial up-scaled motion field from the previous layer of processing and again after the motion field is refined at the full-scale level. The blending may be performed using the time linearity assumption similarly to the processing described at 1116. Optional occlusion detection as described at 1116 and shown by example in FIG. 14 may be incorporated as part of the blending at 1216.

After the co-located reference block is generated at 1216, the process 1200 advances to 1218 to determine whether there are further frame portions (here, blocks) for prediction. If so, the process 1200 repeats starting at 1206 for the next block. The blocks may be processed in the scan order. Once there are no further blocks to consider in response to the query at 1218, the process 1200 ends.

Referring again to FIG. 10, the process 1200 can implement 1006 in the process 1000. At the end of processing at 1006, whether performed according to the process 1100, the process 1200, or a variation of either as described herein, one or more warped reference frame portions exist.

At 1008, a prediction process is performed using the optical flow reference frame portion generated at 1006. Performing a prediction process at an encoder can include generating a prediction block from an optical flow reference frame for a current block of the frame. The optical flow reference frame can be the optical flow reference frame output by the process 1100 and stored in a reference frame buffer, such as the reference frame buffer 600. The optical flow reference frame can be an optical flow reference frame generated by combining the optical flow reference portions output by the process 1200. Combining the optical flow reference portions may include arranging the optical flow reference portions (e.g., co-located reference blocks) according to the pixel positions of the respective current frame portions used in the generation of the each of the optical flow reference portions. The resulting optical flow reference frame can be stored for use in a reference frame buffer of the encoder, such as the reference frame buffer 600 of the encoder 400.

Generating the prediction block at an encoder can include selecting the co-located block in the optical flow reference frame as the prediction block. Generating the prediction block at an encoder can instead include performing a motion search within the optical flow reference frame to select the best matching prediction block for the current block. However the prediction block is generated at the encoder, the resulting residual can be further processed, such as using the lossy encoding process described with regard to the encoder 400 of FIG. 4.

At an encoder, the process 1000 may form part of a rate distortion loop for the current block that uses various prediction modes, including one or more intra prediction modes and both single and compound inter prediction modes using the available prediction frames for the current frame. A single inter prediction mode uses only a single forward or backward reference frame for inter prediction. A compound inter prediction mode uses both a forward and a backward reference frame for inter prediction. In a rate distortion loop, the rate (e.g., the number of bits) used to encode the current block using respective prediction modes is compared to the distortion resulting from the encoding. The distortion may be calculated as the differences between pixel values of the block before encoding and after decoding. The differences can be a sum of absolute differences or some other measure that captures the accumulated error for blocks of the frames.

In some implementations, it may be desirable to limit the use of the optical flow reference frame to the single inter prediction mode. That is, the optical flow reference frame may be excluded as a reference frame in any compound reference mode. This can simplify the rate distortion loop, and little additional impact on the encoding of a block is expected because the optical flow reference frame already considers both a forward and a backward reference frame. According to an implementation described herein, a flag may be encoded into the bitstream to indicate whether or not an optical flow reference frame is available for use in encoding the current frame. The flag may be encoded when any single block within the current frame is encoded using an optical flow reference frame block in an example. Where the optical flow reference frame is available for a current frame, it is possible to include an additional flag or other indicator (e.g., at the block level) indicating whether or not the current block was encoded by inter prediction using the optical flow reference frame.

The prediction process at 1008 may be repeated for all blocks of the current frame until the current frame is encoded.

In a decoder, performing a prediction process using the optical flow reference frame portion at 1008 may result from a determination that an optical flow reference frame is available for decoding the current frame. In some implementations, the determination is made by inspecting a flag that indicates that at least one block of the current frame was encoded using an optical flow reference frame portion. Performing the prediction process at 1008 in the decoder can include generating a prediction block. Generating the prediction block can include using an inter-prediction mode decoded from the encoded bitstream, such as in a block header. A flag or indicator can be decoded to determine the inter-prediction mode. When the inter-prediction mode is an optical flow reference frame mode (i.e., the block was inter-predicted using the optical flow reference frame portion), the prediction block for the current block to be decoded is generated using pixels of an optical flow reference frame portion and a motion vector mode and/or a motion vector.

The same processing to produce an optical flow reference frame for use in a prediction process as part of decoding may be performed at a decoder, such as the decoder 500, as was performed at the encoder. For example, when the flag indicates that at least one block of the current frame was encoded using an optical flow reference frame portion, an entire optical flow reference frame can be generated and stored for use in the prediction process. However, additional savings in computational power at the decoder by modifying the process 1200 to limit performance of the process 1200 where coding blocks are identified as using the co-located/optical flow reference frame as an inter-prediction reference frame. This may be described by reference to FIG. 15, which is a diagram illustrating one technique for optimizing a decoder.

Figure 15:
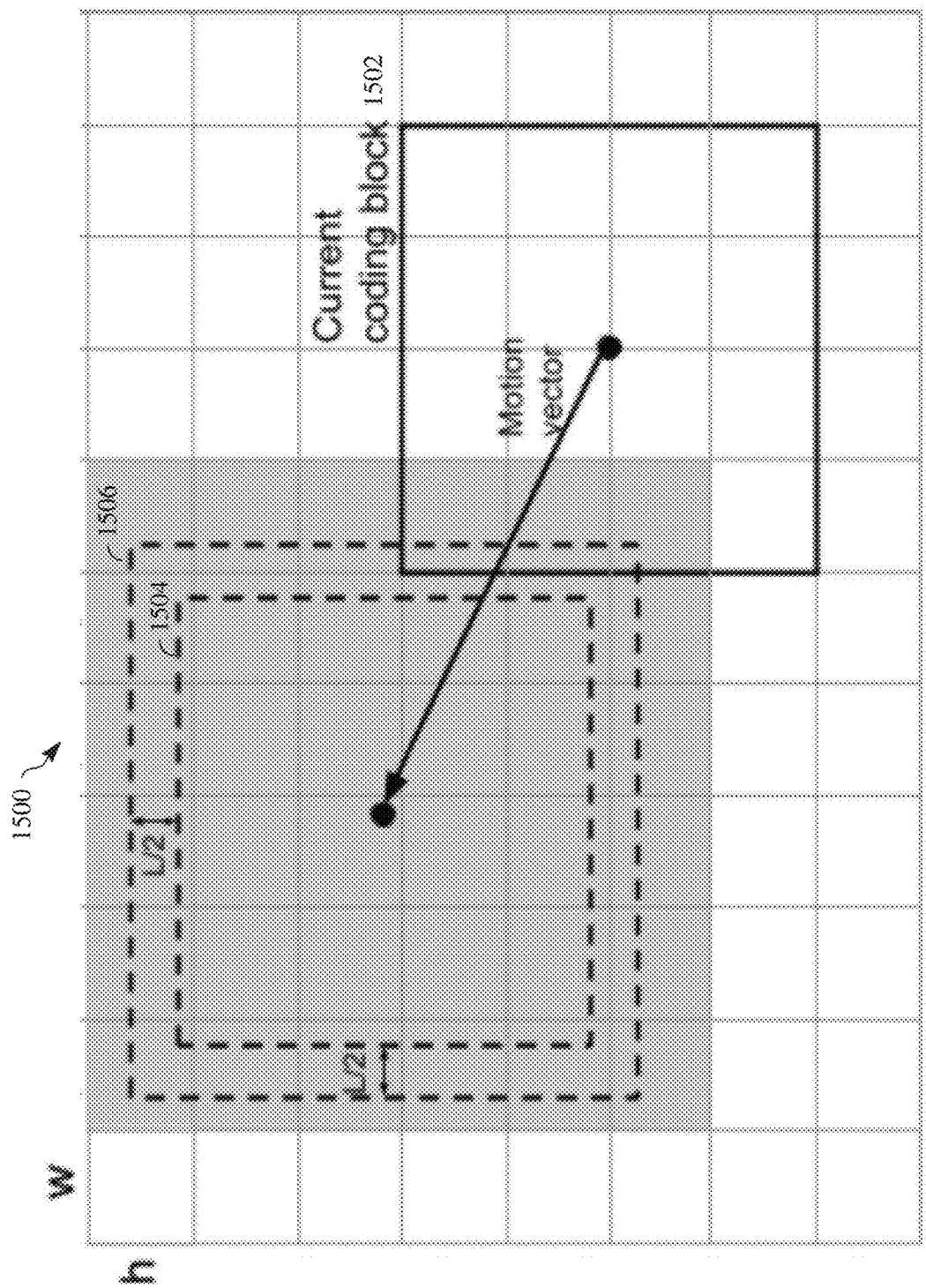
FIG. 15 is a diagram illustrating a technique for optimizing a decoder.

In FIG. 15, pixels are shown along a grid 1500 with w representing a pixel location along a first axis of the grid 1500 and with y representing a pixel location along a second axis of the grid 1500. The grid 1500 represents pixel locations of a portion of the current frame. To perform the prediction process at a decoder at 1008, the processing at 1006 and 1008 may be combined. For example, before performing the process at 1006, the prediction process at 1008 can include finding the reference block used to encode the current block (e.g., from header information, such as a motion vector). In FIG. 15, the motion vector for the current coding block 1502 points to a reference block represented by the inner dashed line 1504. The current coding block 1502 comprises 4×4 pixels. The reference block location is shown by the dashed line 1504 because the reference block is located in the reference frame, and not in the current frame.

Once the reference block is located, all of the reference blocks that are spanned by (i.e., overlap) the reference block are identified. This may include extending the reference block size by half of the filter length at each boundary to consider sub-pixel interpolation filters. In FIG. 15, the sub-pixel interpolation filter length L is used to extend the reference block to the boundaries represented by the outer dashed line 1506. As is relatively common, the motion vector results in a reference block that does not align perfectly with the full-pel locations. The darkened area in FIG. 15 represents the full-pel locations. All of the reference blocks that overlap the full-pel locations are identified. Assuming the block sizes are the same as the current coding block 1502, a first reference block that is co-located with the current block, a second reference block that is above the first reference block, two reference blocks that extend from the left of the first reference block, and two reference blocks that extend from the left of the second reference block are identified.

Once the reference blocks are identified, the process 1200 may be performed at 1006 for only the blocks within the current frame that are co-located with the identified reference blocks so as to produce the co-located/optical flow estimated reference blocks. In the example of FIG. 15, this would result in six optical flow reference frame portions.

According to this modified process, it is ensured that the encoder and decoder have the same predictor while the decoder does not need to calculate the entirety of the co-located reference frame. It is worth noting that reference block(s) for a subsequent block, including any extended borders, may overlap one or more reference blocks identified in the decoding process of the current block. In this case, optical flow estimation need be performed for any of the identified blocks only once to further reduce computing requirements at the decoder. In other words, a reference block generated at 1216 may be stored for use in decoding other blocks of the current frame.

However the prediction block is generated at the decoder, the decoded residual for the current block from the encoded bitstream can be combined with the prediction block to form a reconstructed block as described by example with regard to the decoder 500 of FIG. 5.

The prediction process at 1008, whether performed after or in conjunction with the process 1200, may be repeated for all blocks of the current frame that were encoded using an optical flow reference frame portion until the current frame decoded. When processing blocks in the a decoding order, a block that is not encoded using an optical flow reference frame portion can be conventionally decoded according to the prediction mode decoded for the block from the encoded bitstream.

For N pixels in a frame or block, the complexity of solving the optical flow formulation may be represented by $O(N*M)$, where M is the number of iterations to solve the linear equations. M is not related to the number of levels, or the number of values for the Lagrangian parameter $\lambda$. Instead, M is related to the calculation precision in solving the linear equations. A larger value for M results in better precision. Given this complexity, moving from frame-level to sub-frame-level (e.g., block-based) estimation provides several options for reducing the decoder complexity. First, and because the constraint of motion field smoothness is relaxed at block boundaries, it is easier to converge to a solution when solving the linear equations for a block, resulting in a smaller M for a similar precision. Second, solving for a motion vector involves its neighboring motion vectors due to the smoothness penalty factor. Motion vectors at block boundaries have fewer neighboring motion vectors, thus yielding faster calculations. Third, and as discussed above, the optical flow only needs to be calculated for a portion of the blocks of the co-located reference frame that are identified by those coding blocks using the co-located reference frame for inter prediction, but not the whole frame.

For simplicity of explanation, each of the processes 1000, 1100, and 1200 is depicted and described as a series of steps or operations. However, the steps or operations in accordance with this disclosure can occur in various orders and/or concurrently. Additionally, other steps or operations not presented and described herein may be used. Furthermore, not all illustrated steps or operations may be required to implement a method in accordance with the disclosed subject matter.

The aspects of encoding and decoding described above illustrate some examples of encoding and decoding techniques. However, it is to be understood that encoding and decoding, as those terms are used in the claims, could mean compression, decompression, transformation, or any other processing or change of data.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations of the transmitting station 102 and/or the receiving station 106 (and the algorithms, methods, instructions, etc., stored thereon and/or executed thereby, including by the encoder 400 and the decoder 500) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of the transmitting station 102 and the receiving station 106 do not necessarily have to be implemented in the same manner.

Further, in one aspect, for example, the transmitting station 102 or the receiving station 106 can be implemented using a general purpose computer or general purpose processor with a computer program that, when executed, carries out any of the respective methods, algorithms and/or instructions described herein. In addition, or alternatively, for example, a special purpose computer/processor can be utilized that contains other hardware for carrying out any of the methods, algorithms, or instructions described herein.

The transmitting station 102 and the receiving station 106 can, for example, be implemented on computers in a video conferencing system. Alternatively, the transmitting station 102 can be implemented on a server and the receiving station 106 can be implemented on a device separate from the server, such as a hand-held communications device. In this instance, the transmitting station 102 can encode content using an encoder 400 into an encoded video signal and transmit the encoded video signal to the communications device. In turn, the communications device can then decode the encoded video signal using a decoder 500. Alternatively, the communications device can decode content stored locally on the communications device, for example, content that was not transmitted by the transmitting station 102. Other suitable transmitting and receiving implementation schemes are available. For example, the receiving station 106 can be a generally stationary personal computer rather than a portable communications device and/or a device including an encoder 400 may also include a decoder 500.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations and aspects have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A method, comprising:
    determining a first frame portion of a first frame to be predicted, the first frame being in a video sequence;
    determining a first reference frame from the video sequence for forward inter prediction of the first frame;
    determining a second reference frame from the video sequence for backward inter prediction of the first frame, wherein the second reference frame is different from the first reference frame;
    generating an optical flow reference frame portion for inter prediction of the first frame portion by performing an optical flow estimation using the first reference frame and the second reference frame, wherein the optical flow estimation produces a respective motion field for pixels of the first frame portion, and wherein generating the optical flow reference frame portion comprises:
        performing the optical flow estimation by minimizing a Lagrangian function, J, for respective pixels of the first frame portion, wherein the Lagrangian function, J, for a current pixel of is $$J = J_{data} + \lambda J_{spatial},$$

wherein $J_{data}$ is a data penalty based on a brightness constancy assumption, $J_{spatial}$ is a spatial penalty based on a smoothness of the motion field, and $\lambda$ is a Lagrangian parameter,
    wherein $J_{data} = (E_x u + E_y v + E_t)^2$, u is a horizontal component of a motion field for the current pixel, v is a vertical component of the motion field for the current pixel, $E_x$, $E_y$, and $E_t$ are derivatives of pixel values of reference frame portions with respect to a horizontal axis x, a vertical axis y, and time t, wherein time is represented by frame indexes, and
    wherein $J_{spatial} = (\Delta u)^2 + (\Delta v)^2$, $\Delta u$ is a Laplacian of the horizontal component of the motion field, and $\Delta v$ is a Laplacian of the vertical component of the motion field; and
    performing a prediction process for the first frame portion using the optical flow reference frame.

2. The method of claim 1, wherein generating the optical flow reference frame portion comprises:
    warping pixels of the first reference frame that are co-located with the first frame portion to the first frame portion using the motion fields to form a first warped reference frame portion;
    warping pixels of the second reference frame that are co-located with the first frame portion to the first frame portion using the motion fields to form a second warped reference frame portion; and
    blending the first warped reference frame portion and the second warped reference frame portion to form the optical flow reference frame portion.

3. The method of claim 2, wherein blending the first warped reference frame portion and the second warped reference frame portion comprises:
    combining co-located pixel values of the first warped reference frame portion and the second warped reference frame portion by scaling the co-located pixel values using distances between the first reference frame and the second reference frame and between the first frame and each of the first reference frame and the second reference frame.

4. The method of claim 2, wherein blending the first warped reference frame portion and the second warped reference frame portion comprises:
    populating pixel positions of the optical flow reference frame portion by one of combining co-located pixel values of the first warped reference frame portion and the second warped reference frame portion or using a single pixel value of one or the first warped reference frame portion or the second warped reference frame portion.

5. The method of claim 1, wherein the first frame portion comprises one of a current block of the first frame or the first frame, and the optical flow reference frame portion is a block when the first frame portion comprises the current block and is an entire frame when the first frame portion comprises the first frame.

6. The method of claim 1, wherein the first reference frame is a nearest reconstructed frame in a display order of the video sequence to the first frame that is available for forward inter prediction of the first frame, and the second reference frame is a nearest reconstructed frame in the display order to the first frame that is available for backward inter prediction of the first frame.

7. The method of claim 1, wherein:
the first frame portion is a current block to be decoded,
performing the prediction process comprises:
  using a motion vector used to encode the current block to identify a reference block position;
  adjusting boundaries of the reference block by a sub-pixel interpolation filter length; and
  identifying blocks encompassing pixels within the adjusted boundaries of the reference block, and
generating the optical flow reference frame portion comprises performing an optical flow estimation for blocks of the first frame that are co-located with the identified blocks without performing an optical flow estimation for remaining blocks of the first frame.

8. The method of claim 1, wherein:
the first frame portion is a current block to be encoded,
generating the optical flow reference frame portion comprises performing an optical flow estimation for each block of the first frame as the current block to generate a respective co-located reference block for an optical flow reference frame, and
performing the prediction process comprises:
  forming the optical flow reference frame by combining the co-located reference blocks in their respective pixel positions;
  storing the optical flow reference frame in a reference frame buffer; and
  using the optical flow reference frame for a motion search for the current block.

9. An apparatus, comprising:
a processor; and
a non-transitory storage medium that includes instructions executable by the processor to carry out a method comprising:
determining a first frame to be predicted in a video sequence;
determining an availability of a first reference frame for forward inter prediction of the first frame and a second reference frame for backward inter prediction of the first frame;
responsive to determining the availability of both the first reference frame and the second reference frame:
  generating a respective motion field for pixels of a first frame portion using the first reference frame and the second reference frame as input into an optical flow estimation process;
  warping a first reference frame portion to the first frame portion using the motion fields to form a first warped reference frame portion, the first reference frame portion comprising pixels of the first reference frame co-located with the pixels of the first frame portion;
  warping a second reference frame portion to the first frame portion using the motion fields to form a second warped reference frame portion, the second reference frame portion comprising pixels of the second reference frame co-located with the pixels of the first frame portion; and
  blending the first warped reference frame portion and the second warped reference frame portion to form an optical flow reference frame portion for inter prediction of a block of the first frame,
  wherein generating the respective motion field comprises:
    calculating a first set of motion fields for the pixels of the first frame portion using a first value for a Lagrangian parameter; and
    using the first set of motion fields as input to a Lagrangian function using a second value for the Lagrangian parameter to calculate a refined set of motion fields for the pixels of the first frame portion, wherein the second value for the Lagrangian parameter is smaller than the first value for the Lagrangian parameter, and the first warped reference frame and the second warped reference frame are warped using the refined set of motion fields.

10. The apparatus of claim 9, wherein the method further comprises:
performing a prediction process for the block of the first frame using the optical flow reference frame portion.

11. The apparatus of claim 9, wherein the method further comprises:
using the optical flow reference frame portion only for single reference inter prediction of blocks of the first frame.

12. An apparatus, comprising:
a processor; and
a non-transitory storage medium that includes instructions executable by the processor to carry out a method comprising:
generating an optical flow reference frame portion for inter prediction of a block of a first frame of a video sequence using a first reference frame from the video sequence and a second reference frame of the video sequence by:
initializing motion fields for pixels of a first frame portion in a first processing level for an optical flow estimation, the first processing level representing downscaled motion within the first frame portion and comprising one level of multiple levels;
for each level of the multiple levels:
  warping a first reference frame portion to the first frame portion using the motion fields to form a first warped reference frame portion;
  warping a second reference frame portion to the first frame portion using the motion fields to form a second warped reference frame portion;
  estimating motion fields between the first warped reference frame portion and the second warped reference frame portion using the optical flow estimation, wherein estimating the motion fields comprises:
    calculating a first set of motion fields for pixels of the first reference frame portion using a first value for a Lagrangian parameter; and
    using the first set of motion fields as input to a Lagrangian function using a second value for the Lagrangian parameter to calculate a refined set of motion fields for the pixels of the first reference frame portion, wherein the second value for the Lagrangian parameter is not equal to the first value for the Lagrangian parameter; and
  updating the motion fields for pixels of the first frame portion using the motion fields between the first warped reference frame portion and the second warped reference frame portion;

for a final level of the multiple levels:
  warping the first reference frame portion to the first frame portion using the updated motion fields to form a final first warped reference frame portion;
  warping the second reference frame portion to the first frame portion using the updated motion fields to form a final second warped reference frame portion; and
  blending the final first warped reference frame portion and the second warped reference frame portion to form the optical flow reference frame portion.

13. The apparatus of claim 12, wherein the method further comprises, for each level of the multiple levels:
  initializing the Lagrangian parameter in the Lagrangian function to a maximum value for a first iteration of warping the first reference frame portion, warping the second reference frame portion, estimating the motion fields, and updating the motion fields; and
  performing an additional iteration of warping the first reference frame portion, warping the second reference frame portion, estimating the motion fields, and estimating the motion fields using increasingly smaller values of a set of possible values for the Lagrangian parameter.

14. The apparatus of claim 12, wherein estimating the motion fields comprises:
  calculating derivatives of pixel values of the first warped reference frame portion and the second warped reference frame portion with respect to a horizontal axis, a vertical axis, and time;
  downscaling the derivatives responsive to the level being different from the final level; and
  solving linear equations representing the Lagrangian function using the derivatives.

15. The apparatus of claim 12, wherein the method further comprises:
  inter predicting a current block of the first frame using the optical flow reference frame portion.

16. The apparatus of claim 12, wherein the processor and the non-transitory storage medium form a decoder.

* * * * *